(12) United States Patent  (10) Patent No.: US 7,708,641 B2
Tawara  (45) Date of Patent: May 4, 2010

(54) GAME PROGRAM FOR TOUCH CONTROL HAND-HELD GAME DEVICE

(75) Inventor: Masaki Tawara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1480 days.

(21) Appl. No.: 11/038,396

(22) Filed: Jan. 21, 2005

(65) Prior Publication Data
US 2005/0159217 A1 Jul. 21, 2005

(30) Foreign Application Priority Data
Jan. 20, 2004 (JP) ............................. 2004-012463

(51) Int. Cl.
A63F 13/00 (2006.01)
G09G 5/00 (2006.01)

(52) U.S. Cl. ........................................ 463/31; 345/173

(58) Field of Classification Search ................... 463/31; 345/172–173; 715/810, 851
See application file for complete search history.

(56) References Cited

U.S. PATENT DOCUMENTS

| | | | |
|---|---|---|---|
| 4,275,442 A | 6/1981 | Underwood et al. | |
| 4,279,421 A | 7/1981 | Tepoorten et al. | |
| 5,239,464 A | 8/1993 | Blair et al. | |
| 5,847,698 A | 12/1998 | Reavey et al. | |
| 5,896,133 A | 4/1999 | Lynch et al. | |
| 5,943,043 A | 8/1999 | Furuhata et al. | |
| 6,028,593 A | 2/2000 | Rosenberg et al. | |
| 6,191,777 B1 | 2/2001 | Yasuhara et al. | |
| 6,255,604 B1 | 7/2001 | Tokioka et al. | |
| 6,266,059 B1 | 7/2001 | Matthews et al. | |
| 6,270,413 B1 | 8/2001 | Aikawa et al. | |
| 6,364,764 B1 | 4/2002 | Suzuki | |
| 6,375,571 B1 | 4/2002 | Ohnuma et al. | |
| 6,431,982 B2* | 8/2002 | Kobayashi | 463/4 |
| 6,450,886 B1 | 9/2002 | Oishi et al. | |
| 6,561,906 B2 | 5/2003 | Suzuki | |

(Continued)

FOREIGN PATENT DOCUMENTS

JP 11-202974 7/1999

(Continued)

OTHER PUBLICATIONS

Japanese Office Action issued for corresponding Japanese Patent Application No. 2004-012463, dated Feb. 22, 2008.

(Continued)

*Primary Examiner*—Peter DungBa Vo
*Assistant Examiner*—Masud Ahmed
(74) *Attorney, Agent, or Firm*—Nixon & Vanderhye P.C.

(57) ABSTRACT

When a selected character 50 in possession of a ball 51 enters a centering area, a button switch image 61 for "centering" is displayed on a second LCD 12 provided with a touch panel. If the player touches the button switch image 61, the selected character 50 makes a "centering" pass. The target point for the centering pass varies depending on which portion of the button switch image 61 the player touches. Each point in the button switch image 61 corresponds to a point within the centering area in the game field. This adds variety to the action of a player object by a simple operation, thereby making the game more fun.

6 Claims, 34 Drawing Sheets

U.S. PATENT DOCUMENTS

| | | | |
|---|---|---|---|
| 6,592,455 B1 * | 7/2003 | Okano et al. | 463/8 |
| 6,616,703 B1 | 9/2003 | Nakagawa | |
| 6,738,049 B2 | 5/2004 | Kiser et al. | |
| 6,819,313 B2 | 11/2004 | Abdelhadi et al. | |
| 6,881,149 B2 | 4/2005 | Hasebe et al. | |
| 6,966,837 B1 | 11/2005 | Best | |
| 7,063,616 B2 | 6/2006 | Kuri | |
| 7,084,859 B1 | 8/2006 | Pryor | |
| 7,137,891 B2 * | 11/2006 | Neveu et al. | 463/31 |
| 7,160,191 B2 * | 1/2007 | Matsumoto | 463/31 |
| 7,199,794 B2 | 4/2007 | Mifune et al. | |
| 7,254,775 B2 | 8/2007 | Geaghan et al. | |
| 7,300,344 B2 * | 11/2007 | Fujioka et al. | 463/4 |
| 7,451,408 B2 | 11/2008 | Chan | |
| 2001/0003708 A1 | 6/2001 | Aizu et al. | |
| 2002/0019257 A1 | 2/2002 | Koizumi et al. | |
| 2002/0107060 A1 | 8/2002 | Ohnuma et al. | |
| 2002/0119810 A1 | 8/2002 | Takatsuka et al. | |
| 2002/0135619 A1 | 9/2002 | Allport | |
| 2002/0160823 A1 * | 10/2002 | Watabe et al. | 463/7 |
| 2002/0163507 A1 * | 11/2002 | Kao | 345/173 |
| 2002/0191029 A1 | 12/2002 | Gillespie et al. | |
| 2004/0001048 A1 | 1/2004 | Kraus et al. | |
| 2005/0159197 A1 | 7/2005 | Tawara | |
| 2005/0176502 A1 * | 8/2005 | Nishimura et al. | 463/31 |
| 2006/0007143 A1 | 1/2006 | Davani et al. | |

FOREIGN PATENT DOCUMENTS

| | | | |
|---|---|---|---|
| JP | 2000-163031 A | | 6/2000 |
| JP | 2001-5438 | | 1/2001 |
| JP | 2003-108123 | | 4/2003 |
| JP | 2003108123 | * | 4/2003 |
| WO | WO0079372 | * | 12/2000 |

OTHER PUBLICATIONS

ASCII Corporation, "Tsukaeru Online Soft Mansai! Palm Series Saikyoka Pack 1000, The First Edition," ISBN: 4-7561-3579-X , third printing of the first edition, pp. 90-92, 115 and 309, Feb. 25, 2001.

* cited by examiner

FIG. 21
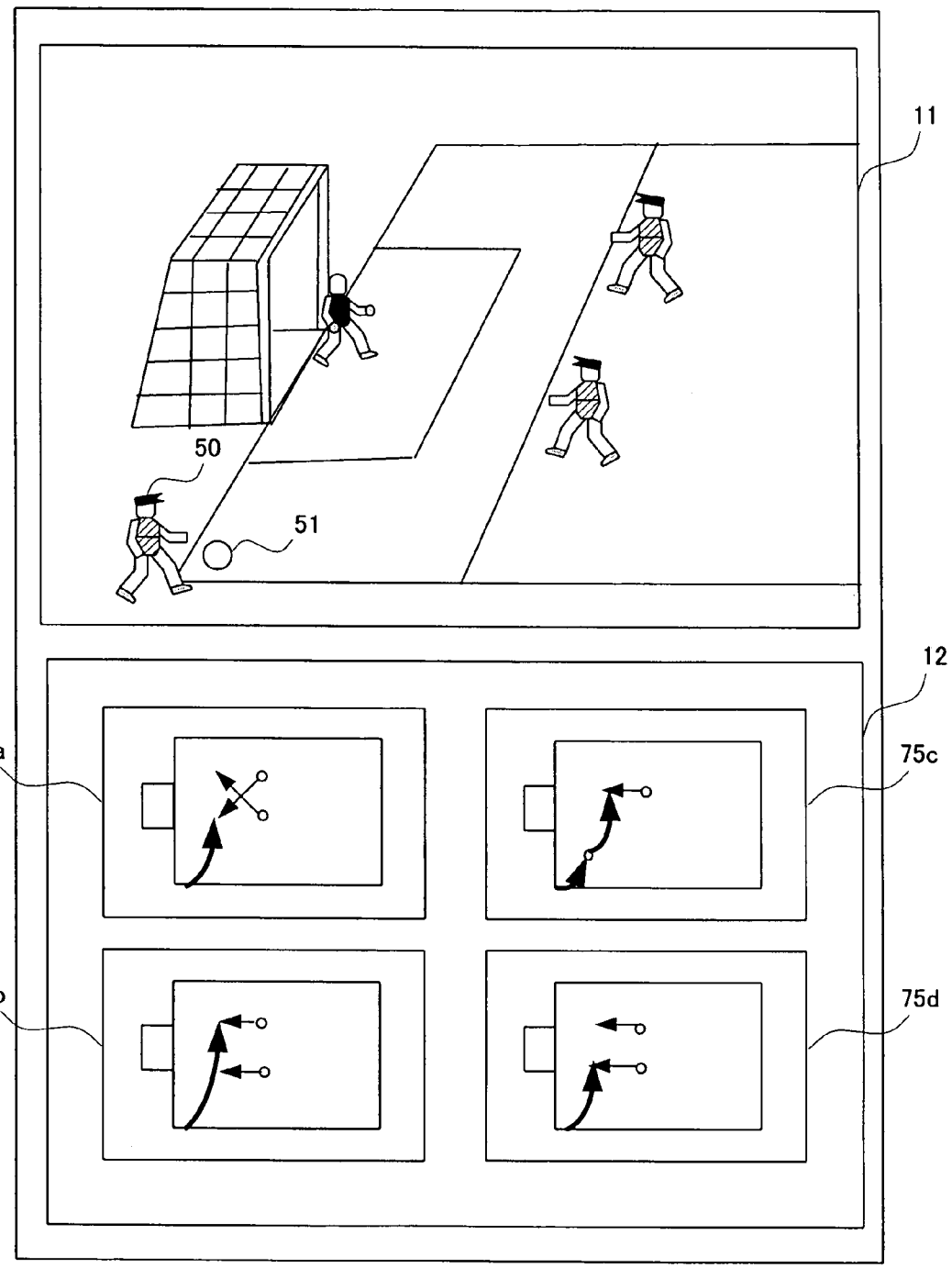
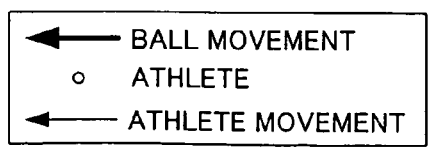

FIG. 25

| TOUCH PANEL (OFFENSE SCENE) | | 811 |
|---|---|---|

| COORDINATE REGION DATA | CONTROL DETAILS |
|---|---|
| TOP LEFT COORDINATES, BOTTOM RIGHT COORDINATES | RIGHT-SIDE ATTACK |
| ... | LEFT-SIDE ATTACK |
| ... | CENTER ATTACK |
| ... | OVERLAP |
| CENTER COORDINATES, MAJOR AXIS, MINOR AXIS | THROUGH-PASS |
| ... | ONE-TWO PASS |
| ... | NORMAL FEINT |
| ... | STEPOVER FEINT |
| ... | KICK FEINT |

FIG. 26

OPERATION SWITCH SECTION

SINGLE OPERATION CONTROL TABLE

DURING OFFENSE:

| CROSS-KEY PAD | DRIBBLE |
|---|---|
| A | SHORT PASS |
| B | SHOOT |

DURING DEFENSE:

| A | SLIDING |
|---|---|
| B | CLEAR |

SIMULTANEOUS OPERATION OR SEQUENTIAL OPERATION CONTROL TABLE

DURING OFFENSE:

| A+B | ONE-TWO PASS |
|---|---|
| R+B | THROUGH-PASS |
| R+B A | FLY THROUGH-PASS |
| L+A | NORMAL FEINT |
| L+B | STEPOVER FEINT |
| L+A+B | KICK FEINT |
| AA | FAR CENTERING |
| BB | NEAR CENTERING |

DURING DEFENSE:

| BB | PRESSING |
|---|---|
| AA | KEEPER RUSH |

818

GAME PROGRAM FOR TOUCH CONTROL HAND-HELD GAME DEVICE

FIELD

The illustrative embodiments relate to a game apparatus and a game program, and more particularly to a game apparatus and a game program which allow the player to use a touch panel to control the action of a player object.

BACKGROUND AND SUMMARY

Conventionally, there have been game apparatuses in which a touch panel is used for controlling a game. For example, Japanese Laid-Open Patent Publication No. 2003-108123 (hereinafter, referred to as "Patent Document 1) discloses a game apparatus in which user selection buttons, buttons for selecting levels, e.g., beginner, intermediate, and advanced levels, etc., are displayed on a touch panel, and the user touches such a button for user selection or level selection.

Switches displayed on the touch panel of the game apparatus disclosed in Patent Document 1 appear to be substitutes for conventional mechanical button switches (such as push button switches, etc.). Specifically, the touch panel appears to be provided instead of providing the mechanical button switches, button switch images may be displayed on the touch panel, and the user may touch the images to perform game control in the same manner as in the case of the mechanical button switches.

A push button switch which is typical of mechanical button switches is operated by the user depressing a button portion of the button switch, and game control that is to be performed as a result of the depression of the button portion does not change regardless of how the button portion is depressed (or where on the button portion the user depresses). Accordingly, basically only one pattern of game control is typically performed by operating the button switch, therefore it is not possible to add variety to the game. In the game apparatus of Patent Document 1, the control may be performed in the same manner as in the case where the mechanical button switches are used.

As the types of action of a player object operated by the player diversify, the number of alternatives for the player's operation increases, making it possible to make the game more fun. However, there is typically a limit to the number of button switches which can be provided to a game apparatus. Even in the case of the game apparatus of Patent Document 1 in which the button switch images are displayed on the touch panel, the number of button switch images which can be displayed at a time is generally limited. Accordingly, in the case where the action of the player object is controlled by means of conventional mechanical button switches or by means of the touch panel as disclosed in Patent Document 1 which appears to be a substitute for the mechanical button switches, there is a limit to the types of action of the player object. On the other hand, if a number of button switch images, which are associated with the types of action of the player object, are displayed on the touch panel in order to diversify the types of action of the player object, the player may become confused and the operability of the touch panel may be reduced.

Also, in the case where it is desired to increase the number of types of action of a game object, a number of actions may be defined by simultaneous and sequential depressions of a plurality of button switches. In this case, the user is required to memorize patterns, such as which buttons are simultaneously depressed, which button is depressed after which button, etc., and such patterns may be complicated to, in particular, a game beginner.

One aspect of the illustrative embodiments provides a game apparatus and a game program which add variety to the action of a player object through a simple input operation, thereby making the game more fun.

The illustrative embodiments may have the following features. Note that reference numerals and the like are added between parentheses in the below description, only for the purpose of facilitating the understanding of the illustrative embodiments, rather than limiting the scope of the invention in any way.

One illustrative exemplary game apparatus executes a game in which an action of a player object (50) is controlled by a player, the game apparatus being provided with game image display means (11) and touch panel display means (12) provided with a touch panel (16).

The game apparatus may comprise button image display control means (31, 849, S27), association means (811), action control means (31, S45), game progression control means (31, 846, S52-S60), and game image display control means (31, 847).

The button image display control means displays a button switch image (58) on the touch panel display means. The association means associates a predetermined action (feint) of the player object with the button switch image. The action control means causes the player object to execute the predetermined action associated with the button switch image if the touch panel detects a contact with the button switch image displayed on the touch panel display means. The game progression control means causes the game to progress in accordance with the action of the player object that is caused by the action control means. The game image display control means displays on the game image di splay means a progression result caused by the game progression control means. The predetermined action includes a plurality of subdivision actions (normal feint, stepover feint, and kick feint). The action control means selects one of the subdivision actions based on a contact point within the button switch image displayed on the touch panel display means.

Points within a region of the touch panel display means where the button switch image is displayed may each be associated with a point within a predetermined region of a virtual game world where the player object is located (FIGS. 10 and 16). The action control means may set a point within the virtual game world, which corresponds to the contact point, as a point associated with the predetermined action.

The predetermined action may be an action performed by the player object to move a game object (51) within the virtual game world. The point associated with the predetermined action may be a destination of a movement of the game object within the virtual game world.

The button image display control means may display an image, which indicates a game object in the predetermined region of the virtual game world, at a location within the button switch image that corresponds to a location of the game object in the predetermined region (61, 66).

Another illustrative exemplary game apparatus executes a game in which an action of a player object (50) is controlled by a player, the game apparatus being provided with game image display means (11) and touch panel display means (12) provided with a touch panel (16).

The game apparatus may comprise button image display control means (31, 849, S15, S19, S27), association means (811), action control means (31, S45), game progression control means (31, 846, S52-S60), and game image display control means (31, 847).

The button image display control means displays a button switch image (56a, 61, 66) on the touch panel display means. The association means associates a predetermined action (through-pass, centering, shoot) of the player object with the button switch image. The action control means causes the player object to execute the predetermined action associated with the button switch image if the touch panel detects a contact with the button switch image displayed on the touch panel display means. The game progression control means causes the game to progress in accordance with the action of the player object that is caused by the action control means. The game image display control means displays on the game image display means a progression result caused by the game progression control means. The action control means changes a value of a parameter (pass strength, target point for centering, target point for shoot) related to the predetermined action based on a contact point within the button switch image displayed on the touch panel display means.

The predetermined action may be an action performed by the player object to move a game object (51) within a virtual game world. The action control means determines, based on the contact point, a value of a parameter (movement speed, target point for movement, movement direction) for moving the game object by means of the predetermined action (FIGS. 6, 10, and 16).

Points within a region of the touch panel display means where the button switch image is displayed may each be associated with a point within a predetermined region of a virtual game world where the player object is located (FIGS. 10 and 16). The action control means may set a point within the virtual game world, which corresponds to the contact point, as a point associated with the predetermined action.

The predetermined action may be an action performed by the player object to move a game object (51) within the virtual game world. The point associated with the predetermined action may be a destination of a movement of the game object within the virtual game world.

The button image display control means may display an image, which indicates a game object in the predetermined region of the virtual game world, at a location within the button switch image that corresponds to a location of the game object in the predetermined region (61, 66).

Each point within a region of the touch panel display means where the button switch image is displayed may be associated with a point within a predetermined region of a virtual game world where the player object is located. Also, the button image display control means may display an image, which indicates a game object in the predetermined region of the virtual game world, at a location within the button switch image that corresponds to a location of the game object in the predetermined region. Also, if a game object displayed in the button switch image is touched, the action control means may execute a predetermined action associated with the game object.

An illustrative exemplary computer-readable storage medium may have stored therein a game program which causes a computer of a game apparatus to execute a game in which an action of a player object (50) is control led by a player, the game apparatus comprising game image display means (11), and touch panel display means (12) provided with a touch panel (16).

The game program may cause the computer to act as: button image display control means (31, 849, S27); action control means (31, S45); game progression control means (31, 846, S52-S60); and game image display control means (31, 847).

The button image display control means displays a button switch image (58) on the touch panel display means. The action control means causes the player object to execute the predetermined action associated with the button switch image if the touch panel detects a contact with the button switch image displayed on the touch panel display means. The game progression control means causes the game to progress in accordance with the action of the player object that is caused by the action control means. The game image display control means displays on the game image display means a progression result caused by the game progression control means. The predetermined action includes a plurality of subdivision actions (normal feint, stepover feint, kick feint). The action control means selects one of the subdivision actions based on a contact point within the button switch image displayed on the touch panel display means.

Another exemplary illustrative computer-readable storage medium may have stored therein a game program which causes a computer of a game apparatus to execute a game in which an action of a player object (50) is controlled by a player, the game apparatus comprising game image display means (11), and touch panel display means (12) provided with a touch panel (16).

The game program may cause the computer to act as: button image display control means (31, 849, S15, S19, S27); action control means (31, S45); game progression control means (31, 846, S52-S60); and game image display control means (31, 847).

The button image display control means displays a button switch image (56a, 61, 66) on the touch panel display means. The action control means causes the player object to execute the predetermined action associated with the button switch image if the touch panel detects a contact with the button switch image displayed on the touch panel display means. The game progression control means causes the game to progress in accordance with the action of the player object that is caused by the action control means. The game image display control means for displaying on the game image display means a progression result caused by the game progression control means. The action control means changes a value of a parameter (pass strength. target point for centering, target point for shoot) related to the predetermined action based on a contact point within the button switch image displayed on the touch panel display means.

The illustrative embodiments may make it possible to provide a game apparatus which adds variety to the action of a player object by a simple operation, thereby making the game more fun.

It may further be possible to increase the variation of movement in a game where a game object is moved by the player's operation.

Also, both an instruction concerning an action and a designation of a point related to that action may be given by a single button operation. This realizes quick and simple operation. Also, points in the button switch image may be associated with the virtual game world, making intuitive operation possible.

Further, both an instruction concerning an action and a designation of a destination may be given by a single button operation, making intuitive operation possible.

Additionally, it may be possible to appropriately designate a point related to an action with consideration of where the game object is located.

These and other aspects of the illustrative embodiments will become more apparent from the following detailed description of the illustrative embodiments when taken in conjunction with the accompanying drawings.

BRIEF DESCRIPTION OF THE DRAWINGS

FIG. 21 shows examples of display images on the first and second LCDs 11 and LCD 12 which may be displayed during a corner kick;

FIG. 25 shows an exemplary operation control table 811 for offense scene;

FIG. 26 shows an exemplary operation control table 818 associated with an operation switch section 15;

DESCRIPTION OF THE ILLUSTRATIVE EMBODIMENTS

Hereinafter, a hand-held game apparatus according to the illustrative embodiments will be described with reference to the accompanying drawings.

Figure 1:
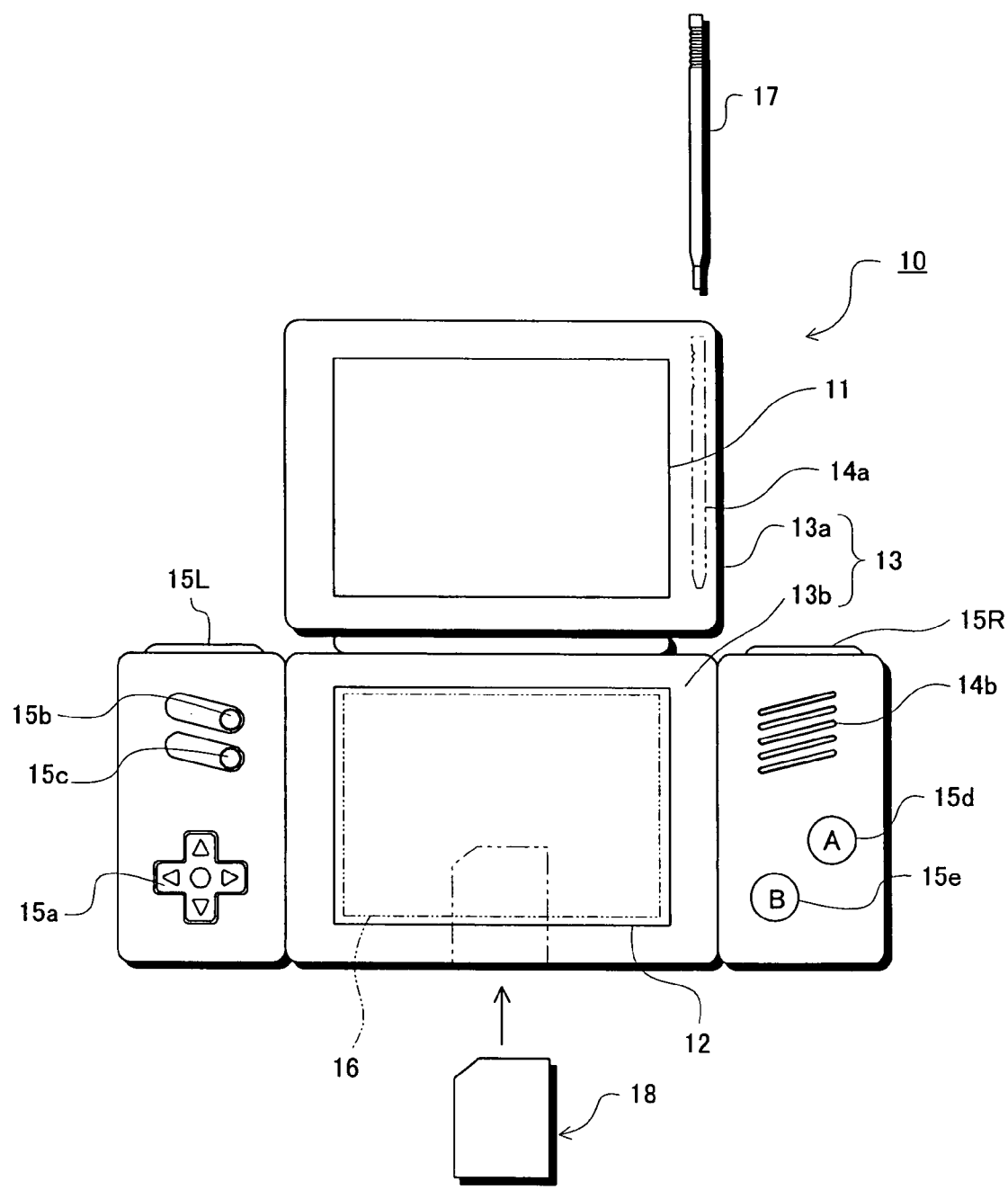
FIG. 1 is an external view of a hand-held game apparatus according to one illustrative embodiment.

FIG. 1 is an external view of a hand-held game apparatus according to an illustrative embodiment. In FIG. 1, a hand-held game apparatus 10 is accommodated in a housing 13 so that two liquid crystal display devices (hereinafter, referred to as "LCDs") 11 and 12 are placed in predetermined positions. Specifically, in the case where the first and second LCDs 11 and 12 are to be disposed one on top of the other, the housing 13 is composed of an upper housing 13a and a lower housing 13b, the upper housing 13a being supported by a portion of the upper side of the lower housing 13b so as to be pivotable. The upper housing 13a has a planar contour which is slightly larger than that of the first LCD 11. The upper housing 13a has an opening in one principal face thereof, through which a display screen of the first LCD 11 is exposed. The lower housing 13b has a more elongated planar contour than that of the upper housing 13a so as to have a longer lateral dimension. An opening for exposing the display screen of the second LCD 12 is formed in a portion of the upper housing 13a which lies substantially in the center of the upper housing 13a along the lateral direction. A sound hole 14b is formed in either (right or left) wing of the upper housing 13a between which the second LCD 12 is interposed. An operation switch section 15 is provided on the right and left wings of the upper housing 13a between which the second LCD 12 is interposed.

The operation switch section 15 includes: a direction switch 15a, a start switch 15b, and a select switch 15c, which are provided on a principal face of the left wing of the lower housing 13b lying to the left of the second LCD 12; operation switches 15d and 15e, which are provided on a principal face of the right wing of the lower housing 13b lying to the right of the second LCD 12; and side switches 15L and 15R, which are provided on an upper face (upper side face) of the lower housing 13b. The direction switch 15a is used by a player for providing instructions concerning directions on the game screen, e.g., instructions of a moving direction in which to move a player object (or a player character) that can be controlled by using the operation switch section 14, or instructions of a moving direction in which to move a cursor, for example. The operation switches 15d and 15e are used for giving instructions such as: "jump", "punch", "use a weapon", etc., in the case of an action game; or "get an item", "select a weapon", "select a command", etc., in the case of a role playing game (RPG) or a simulation RPG. As necessary, more operation switches may be added.

A touch panel 16 is mounted on the upper principal face of the second LCD 12. The touch panel 16 may be of any one of a resistive film type, an optical type (infrared type), and a capacitive coupling type. When a stick 17 (or a finger) is pressed against or moved or dragged on the upper principal face of the touch panel 16, the touch panel 16 detects the coordinate position of the stick 17 and outputs coordinate data.

As necessary, an accommodation hole 14a for accommodating the stick 17 is provided near a side face of the upper housing 13a. In a portion of a side face of the lower housing 13b is provided a cartridge receptacle (not shown) into which a game cartridge 18 internalizing a memory having a game program stored therein (e.g., a ROM) is detachably inserted. A connector (not shown) lies inside the cartridge receptacle for providing electrical connection with the game cartridge 18. Furthermore, the lower housing 13b (or alternatively the upper housing 13a) accommodates an electronic circuit board (30 shown in FIG. 2 which will be described later) on which various electronic components such as a CPU are mounted. Examples of the information storage medium for storing a game program are not limited to a non-volatile semiconductor memory such as a ROM or a flash memory, but may also be a CD-ROM, a DVD, or any other optical disk type storage medium. Note that although the game program is supplied from the game cartridge 18 to the hand-held game apparatus 10, this is not limiting. The game program may be previously incorporated in the hand-held game apparatus 10, or may be externally provided to the hand-held game apparatus 10 via a communication line.

Figure 2:
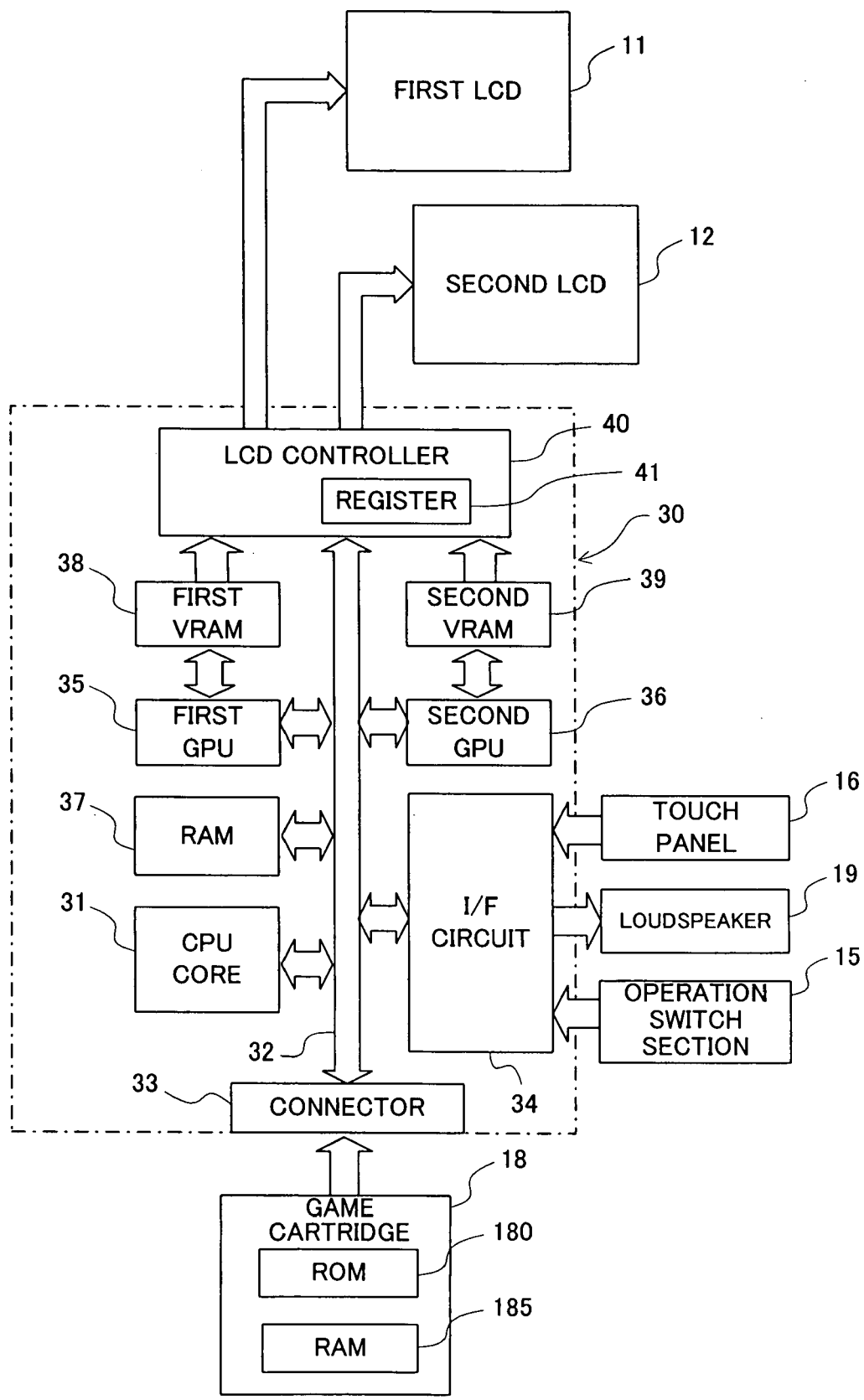
FIG. 2 is a block diagram of the hand-held game apparatus 10.

FIG. 2 is a block diagram of the hand-held game apparatus 10. In FIG. 2, a CPU core 31 is mounted on the electronic circuit board 30 accommodated in the housing 13. Via a bus 32, the CPU core 31 is connected to a connector 33 for enabling connection with an input/output interface (I/F) circuit 34, a first graphics processing unit (first GPU) 35, a second graphics processing unit (second GPU) 36, a RAM 37, and an LCD controller 40. The game cartridge 18 is detachably connected to the connector 33. The game cartridge 18 is a storage medium for storing a game program. Specifically, the game cartridge 18 includes a ROM 180 for storing a game program and a RAM 185 for storing backup data in a rewritable manner. A game program which is stored in the ROM 180 of the game cartridge 18 is loaded onto a RAM 37, and the game program having been loaded onto the RAM 37 is executed by the CPU core 31. Temporary data which is obtained by the CPU core 31 executing the game program and data from which to generate images are stored in the RAM 37. The operation switch section 15, the touch panel 16, and the loudspeaker 19 are connected to the I/F circuit 34. The loudspeaker 19 is placed inside the sound hole 14b.

The first GPU 35 is connected to a first video-RAM (first VRAM) 38. The second GPU 36 is connected to a second video-RAM (second VRAM) 39. In accordance with an instruction from the CPU core 31, the first GPU 35 generates a first game image on the basis of the data used for image generation which is stored in the RAM 37, and writes (stores) images into the first VRAM 38. In accordance with an instruction from the CPU core 31, the second GPU 36 generates a second game image on the basis of the data used for image generation which is stored in the RAM 37, and writes (stores) images into the second VRAM 39. The first and second VRAMs 38 and 39 are connected to the LCD controller 40.

The LCD controller 40 includes a register 41. The register 41 stores therein a value of 0 or 1 in accordance with an instruction from the CPU core 31. In the case where the value in the register 41 is 0, the LCD controller 40 outputs a game image written in the first VRAM 38 to the first LCD 11, and also outputs a game image written in the second VRAM 39 to the second LCD 12. Also, in the case where the value in the register 41 is 1, the LCD controller 40 outputs a game image written in the first VRAM 38 to the second LCD 12, and also outputs a game image written in the second VRAM 39 to the first LCD 11.

The I/F circuit 34 is a circuit which governs exchanges of data between the CPU core 31 and the external input/output devices such as the operation switch section 15, the touch panel 16, and the loudspeaker 19. The touch panel 16 (including a device driver for the touch panel) has a coordinate system corresponding to the coordinate system of the second VRAM 39, and outputs data of position coordinates corresponding to a position which is input (designated) by means of the stick 17. For example, the display screen of the second LCD 12 has a resolution of 256 dots×192 dots, and the touch panel 16 also has a detection accuracy of 256 dots×192 dots so as to correspond to the display screen of the second LCD 12. The detection accuracy of the touch panel 16 may be lower or higher than the resolution of the display screen of the second LCD 12.

Hereinbelow, the flow of a game process executed by the hand-held game apparatus 10 will be described with reference to specific examples of display images. In one illustrative embodiment, a game which is executed by the hand-held game apparatus 10 is a soccer game, though the illustrative embodiments can be applied to many types of games.

Figure 3:
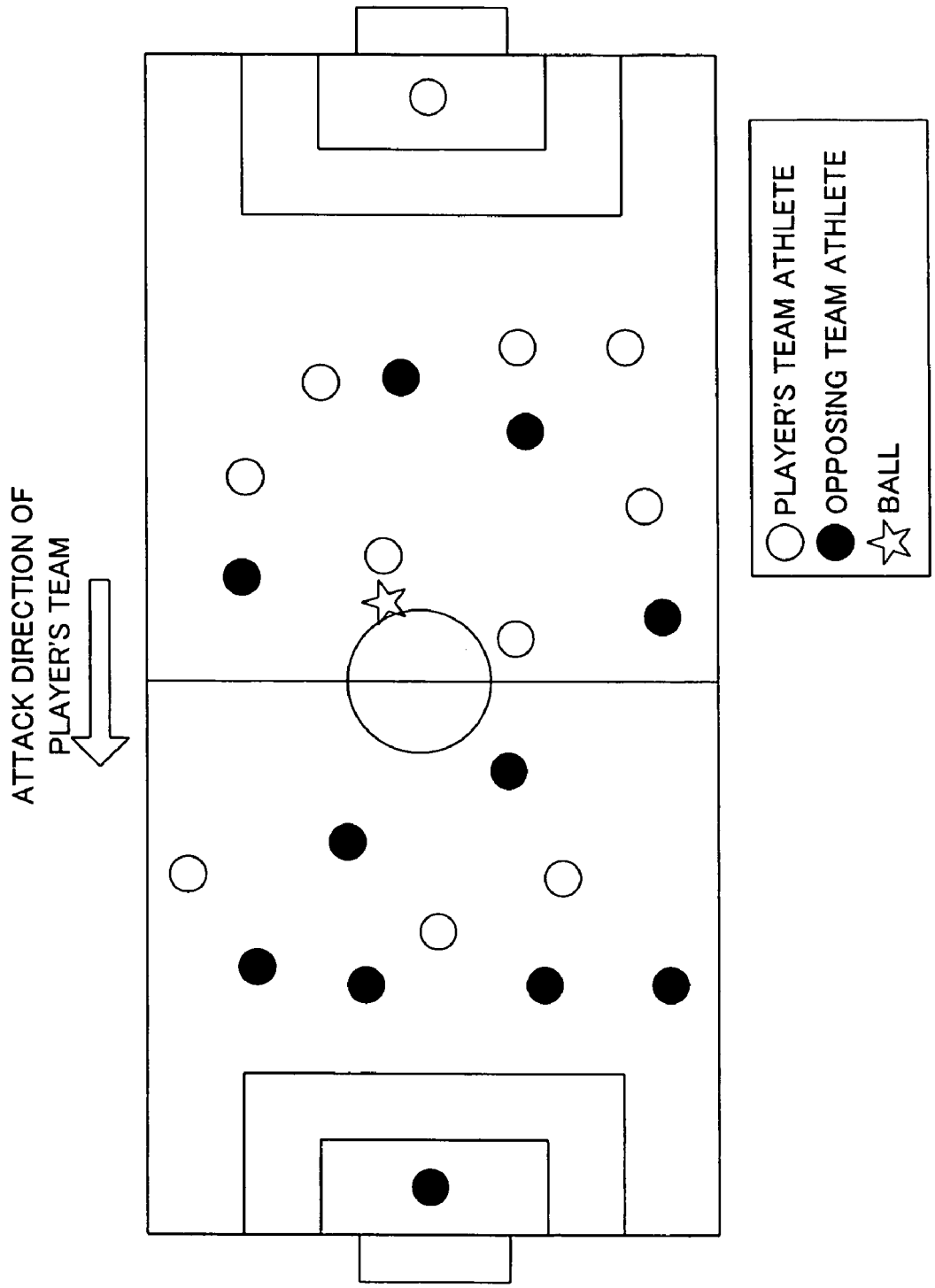
FIG. 3 is a diagram showing a virtual game field of a soccer game.

FIG. 3 is a conceptual diagram showing a virtual game field of a soccer game. In the following descriptions, a team for an object operated by the player (hereinafter, referred to as the "player's team") is on offense to the left of the game field shown in FIG. 3. The opposing team is automatically controlled by the computer based on a predetermined algorithm. Note that the opposing team may be operated by another player.

Figure 4:
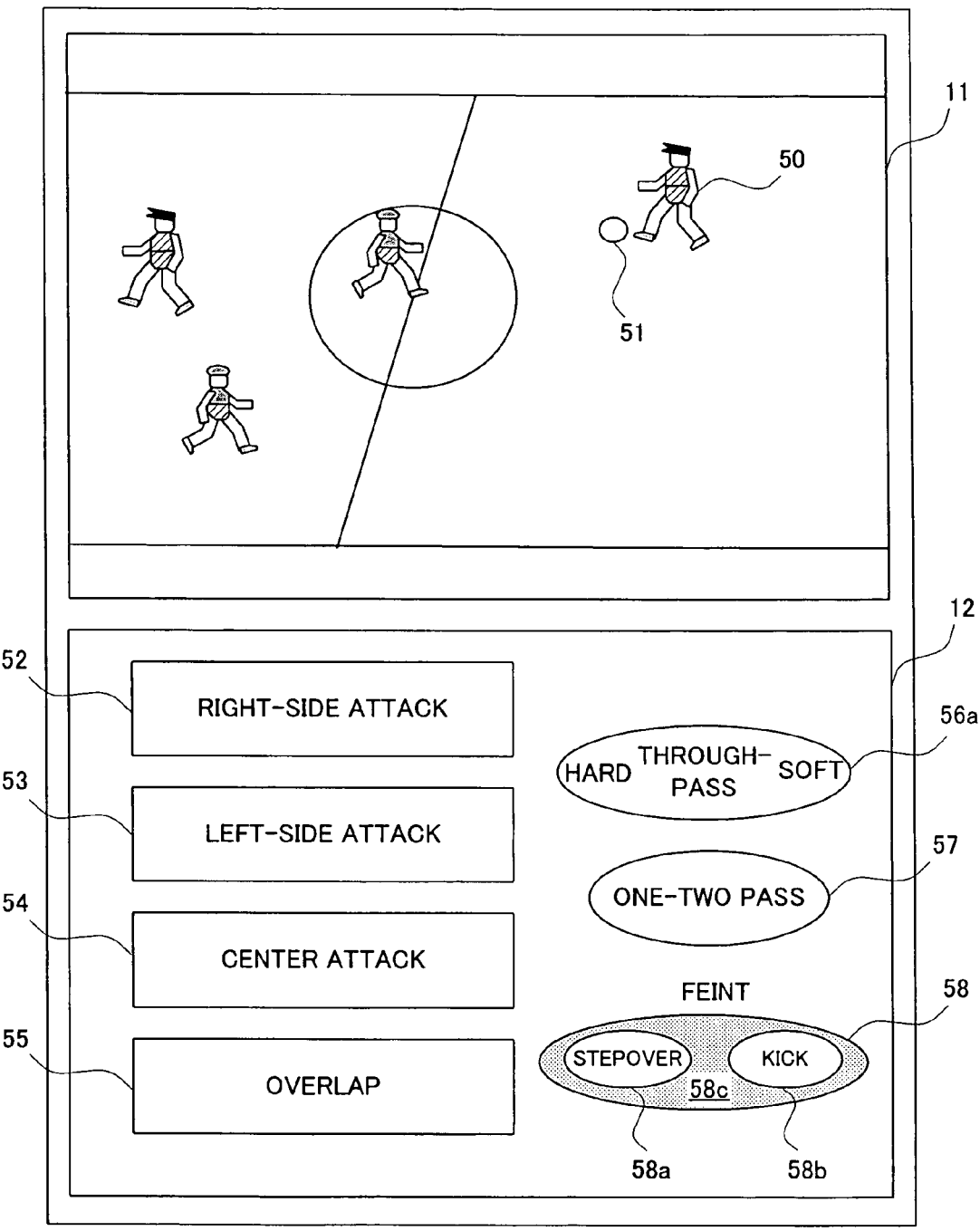
FIG. 4 shows examples of display images on first and second LCDs 11 and 12 which may be displayed during a normal offense.

FIG. 4 shows examples of display images on the first and second LCDs 11 and 12 which are displayed when the player's team keeps the ball (i.e., on offense). The first LCD 11 displays the game field, and the second LCD 12 displays a touch panel image including a plurality of button switch images 52-55, 56a, 57, and 58. The player operates the direction switch 15a (hereinafter, referred to as a "cross key") to move a character 50 which keeps a ball 51 (i.e., the character dribbles the ball). When the player's team is on offense, the player can operate a character on the team that is in possession of the ball. When the player's team is on defense, the player can operate a character that is the closest to the ball. Hereinbelow, the character that is being operated by the player is referred to as a "selected character", and other characters are referred to as "non-selected characters".

The player operates the operation switch 15d (hereinafter, referred to as "A button"), the operation switch 15e (hereinafter, referred to as "B button"), the side switch 15L (hereinafter, referred to as "L button"), and the side switch 15R (hereinafter, referred to as "R button") to give instructions concerning the action of a selected character 50 and the strategy of the player's team. For example, if the player depresses the A button, the selected character 50 makes a "short pass". Also, if the player depresses the B button, the selected character 50 makes a "shot". Note that the player is able to enter an instruction different from those which can be entered by operating individual operation switches by simultaneously depressing a plurality of operation switches or repeatedly or sequentially depressing one or more operation switches at short intervals. For example, if the player depresses A button and B button simultaneously, the selected character 50 makes a "one-two pass (wall pass)". Also, if R button and B button are depressed simultaneously, the selected character 50 makes a "through-pass". Similarly, a "normal feint" is made by simultaneously depressing L button and A button, a "stepover feint (in which the selected character steps over the ball)" is made by simultaneously depressing L button and B button, and a "kick feint (in which the selected character pretends to kick the ball)" is made by simultaneously depressing L button, A button, and B button. Also, if A button is repeatedly depressed twice, the selected character 50 makes a "far-centering pass (by which the ball is centered to the far-side)", and if B button is repeatedly depressed twice, the selected character 50 makes a "near-centering pass (by which the ball is centered to the near-side)".

Also, the player can enter instructions by touching the touch panel 16 with the stick 17 or a finger. As described above, on the second LCD 12 provided with the touch panel 16 is displayed a touch panel image including a plurality of button switch images 52-55, 56a, 57, and 58, and the player can enter a desired instruction by touching a button switch image associated with the desired instruction. For example, if the player touches the button switch image 57, the selected character 50 makes a "one-two pass". In this manner, the player can provide an instruction to make a "one-two pass" by a simple operation compared to an operation by means of operation switches (simultaneous depression of A button and B button). Also, the button switch image 57 includes the words ("one-two pass") which indicates the action of a character (or may include an illustration which represents the action), and therefore the player can quickly determine which button switch image should be depressed in the current situation only by taking a look at the touch panel image. Note that in FIG. 4, the rectangular button switch images 52-55 are intended for entering instructions concerning the strategy of the player's team, and the oval button switch images 56a, 57, and 58 are intended for entering instructions concerning actions of specific characters (in particular, the selected character 50) of the player's team.

In FIG. 4, the button switch image 58 associated with "feint" is provided with two regions 58a and 58b, which read respectively "stepover" and "kick". If the player depresses the region 58a which reads "stepover", the selected character 50 makes a "stepover feint". Also, if the player depresses the region 58b which reads "kick", the selected character 50 makes a "kick feint". Note that if the player depresses a region 58c, the selected character 50 makes a "normal feint". As such, the button switch image for making an action (feinting) includes button switch images for making actions in one category (feinting) which is classified into subdivisions (such as a stepover feint or a kick feint). The regions 58a and 58b are smaller than the region 58c, and therefore it is difficult for the player to accurately touch the regions 58a and 58b during the game. However, it is so configured that the "stepover feint" and the "kick feint" achieve a higher effect of feinting than the effect achieved by the "normal feint", resulting in an increase of the possibility of successfully feinting past players of the opposing team. Accordingly, the player tends to attempt to touch the regions 58a or 58b, resulting in prevention of entering excessively monotonous instructions.

The button switch image 58 can be said to consist of a button switch image ("feint") which incorporates two other button switch images ("stepover" and "kick"). In this manner, the touch panel image includes a plurality of button switch images related to each other, which are displayed in a hierarchical manner (as in a contour map), leading to easy viewing of the screen image making it easy to enter instructions.

Figure 5:
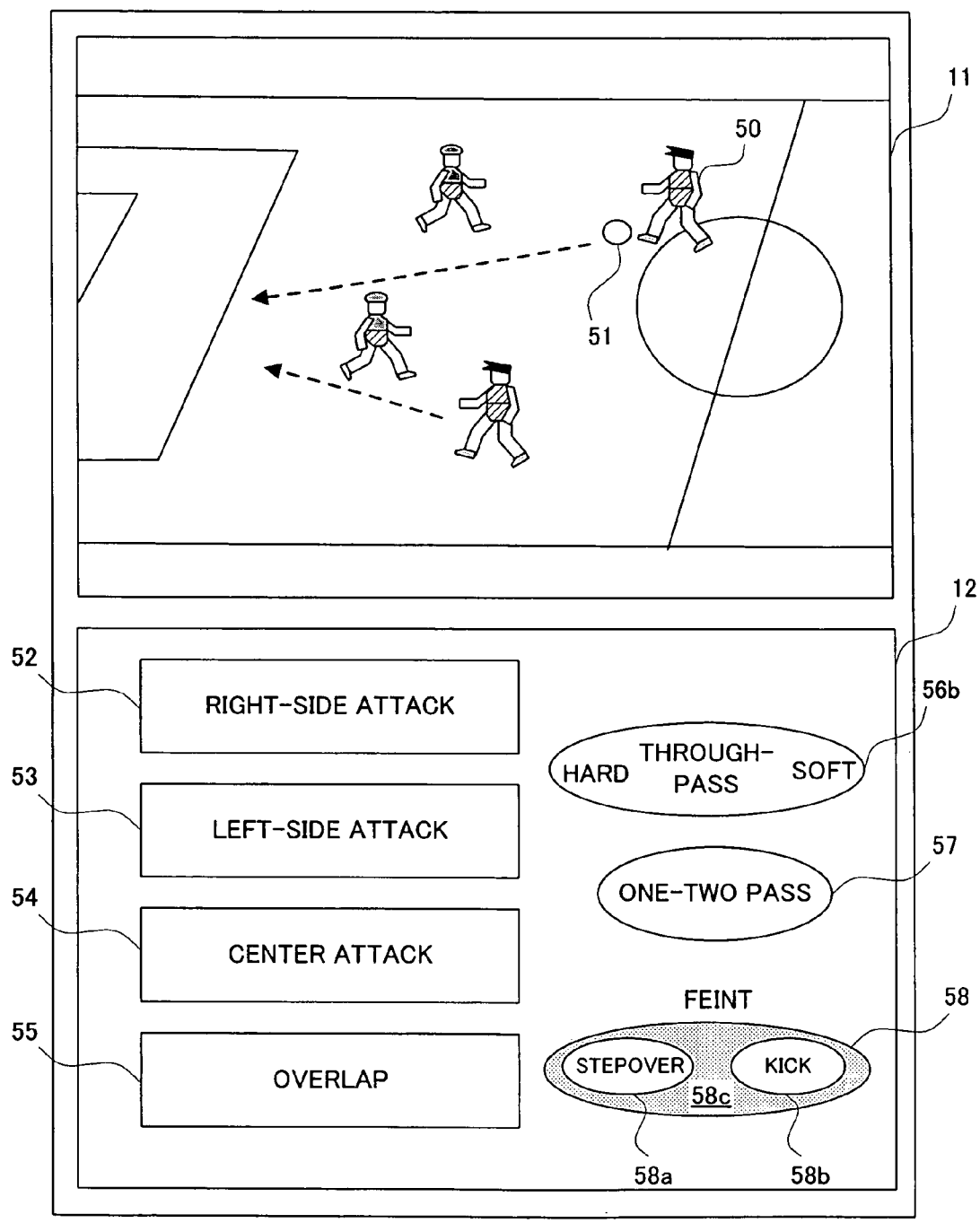
FIG. 5 shows examples of display images on the first and second LCDs 11 and 12 which may be displayed when a character in possession of a ball is able to make a through-pass.

FIG. 5 shows examples of display images on the first and second LCDs 11 and 12 which are displayed when the selected character 50 is able to make a through-pass (or an effective through-pass). FIG. 5 differs from FIG. 4 in that the size of a button switch image 56b associated with "through-pass" is larger than that of the button switch image 56a shown in FIG. 4. This allows the player to readily become aware of when the through-pass can be made. Also, the increase in size of the button switch image allows the player to readily depress the button switch. Note that if the player depresses the button switch image 56a in the situation as shown in FIG. 4, the selected character 50 simply kicks the ball 51 toward the front, failing to make a through-pass.

Figure 6:
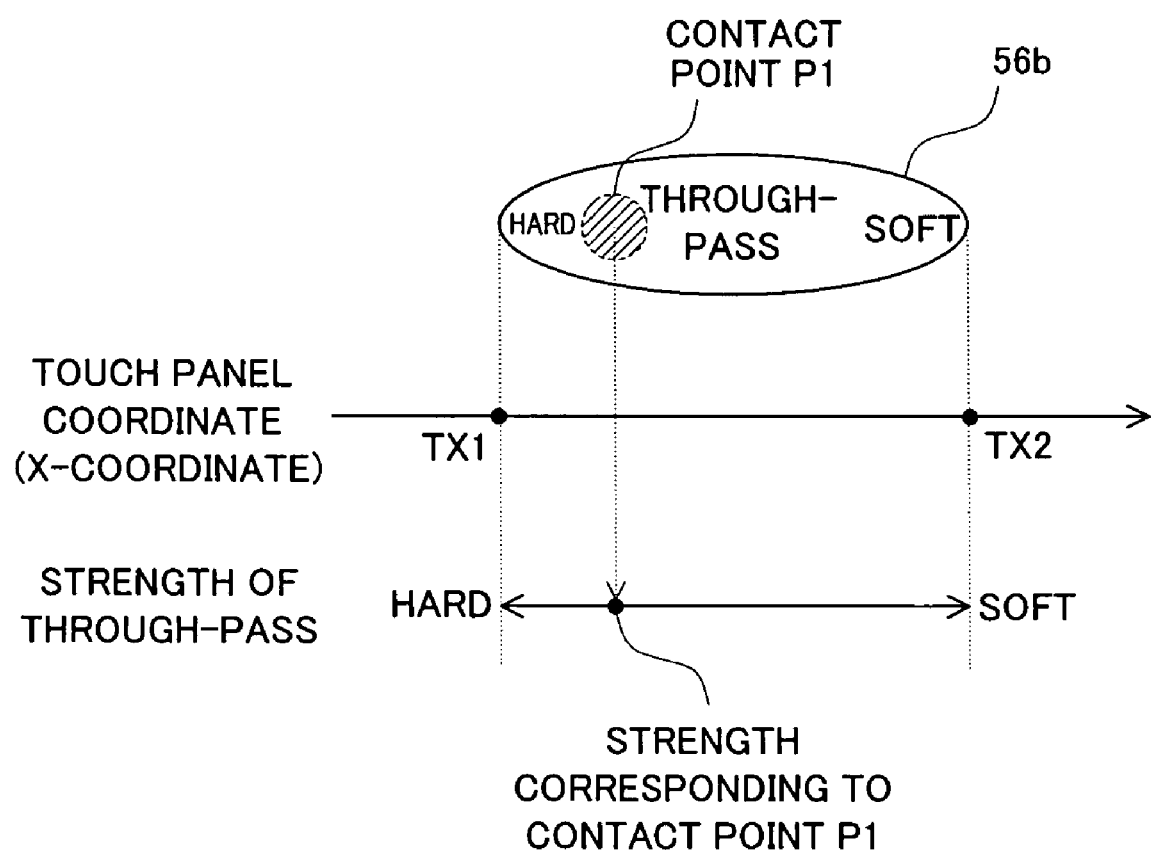
FIG. 6 is a diagram which shows how the strength of a through-pass may be determined.

If the player touches the button switch image 56b associated with "through-pass", the selected character 50 makes a "through-pass". The strength of the pass varies depending on a portion of the button switch image 56b that is touched by the player. The strength of the pass increases toward the left side of the button switch image 56b, and decreases toward the right side. Specifically, as shown in FIG. 6, the strength of the through-pass varies depending on an X-coordinate value of contact point P1 at which the stick 17 or a finger touches the button switch image 56b (a piece of coordinate data outputted from the touch panel 16). Note that in the coordinate data outputted from the touch panel 16, the horizontal direction of the second LCD 12 corresponds to the X-axis direction, and the vertical direction thereof corresponds to the Y-axis direction. Conventionally, the pass strength generally varies depending on a time period for which the operation switch 15d, 15e, or the like is kept depressed. It is possible, however, to provide an instruction concerning both the type and intensity of a pass by touching the button switch image 56b only once. Accordingly, even a player who is not accustomed to the game is able to freely and readily change the pass strength.

Figure 7:
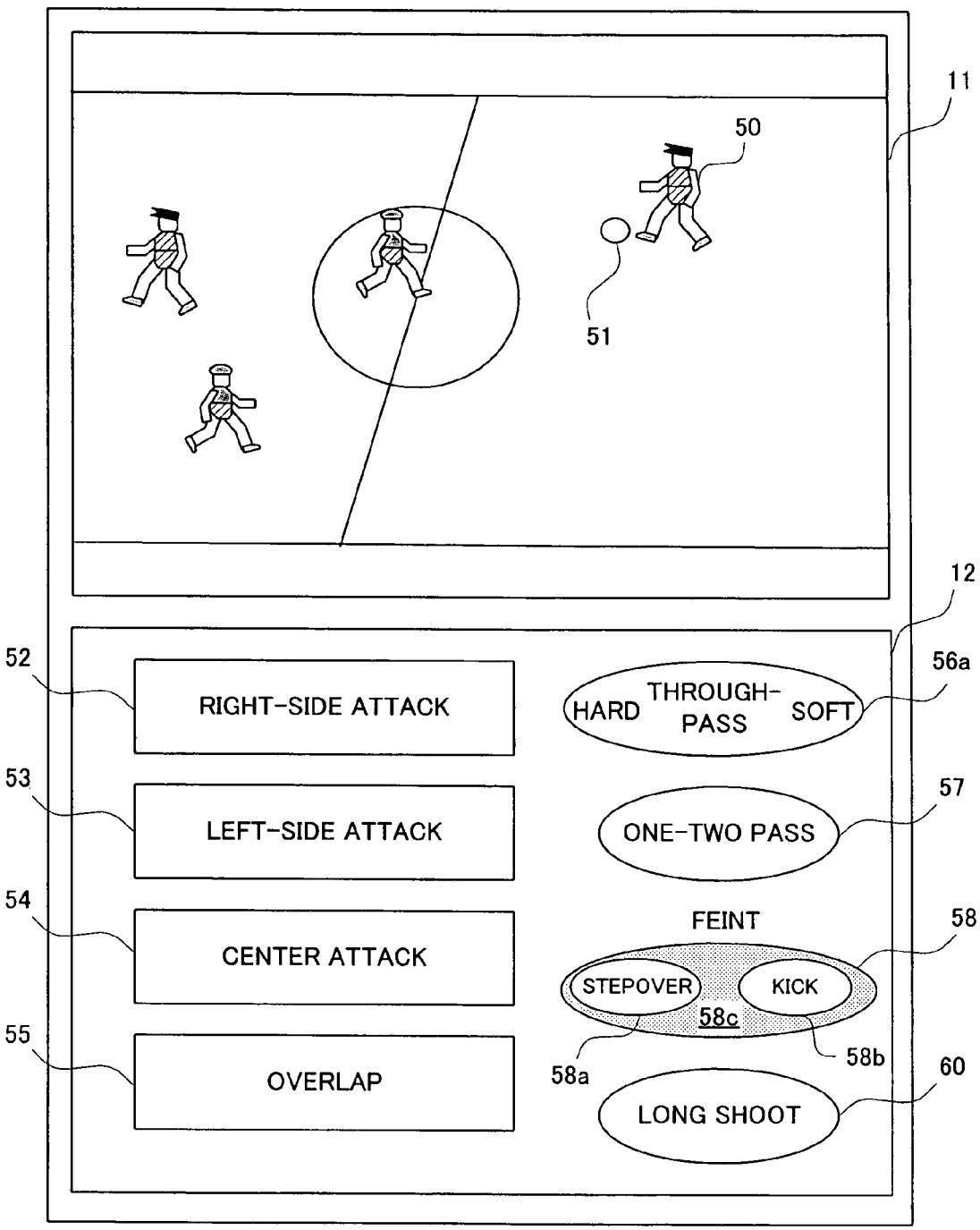
FIG. 7 shows examples of display images on the first and second LCDs 11 and 12 which may be displayed when a character having a special ability keeps a ball.

FIG. 7 shows examples of display images on the first and second LCDs 11 and 12 which are displayed in the situation where a character having a special ability keeps the ball 51. FIG. 7 differs from FIG. 4 in that a button switch image 60 for a "long shoot" is additionally included in the touch panel image. In the case where the selected character 50 has a special ability (in this example, a "long shoot"), the button switch image for executing the special ability is not displayed until the selected character 50 keeps the ball 51. The display of the button switch image 60 allows the player to readily become aware of what kind of skill the selected character 50 has, making it possible to allow the player to readily give an instruction to execute that skill.

Figure 8:
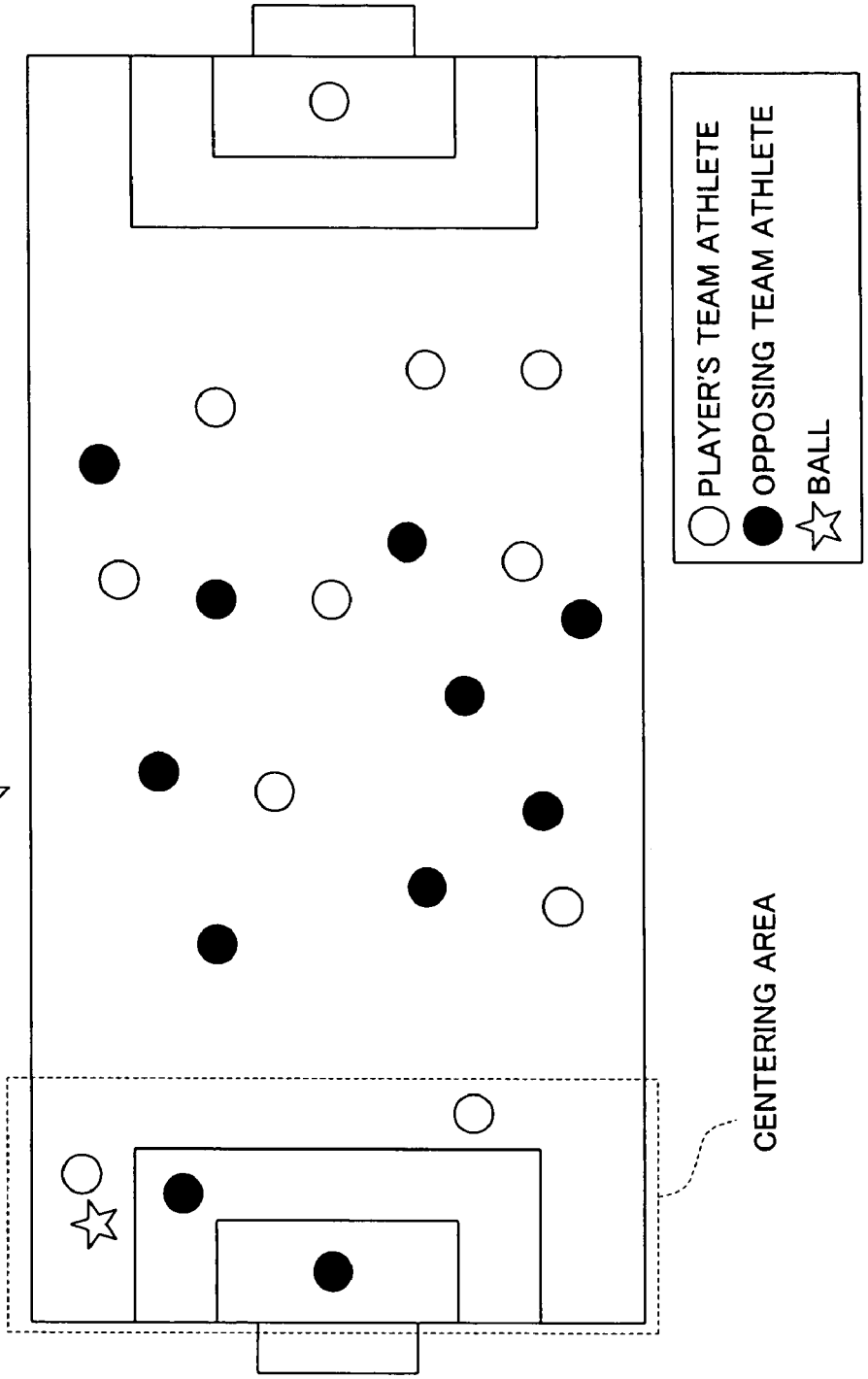
FIG. 8 is a diagram showing a centering area.

Described next is a case where the selected character 50 in possession of the ball 51 enters a centering area. FIG. 8 is a conceptual diagram showing such a situation. In FIG. 8, the centering area is indicated by broken lines.

Figure 9:
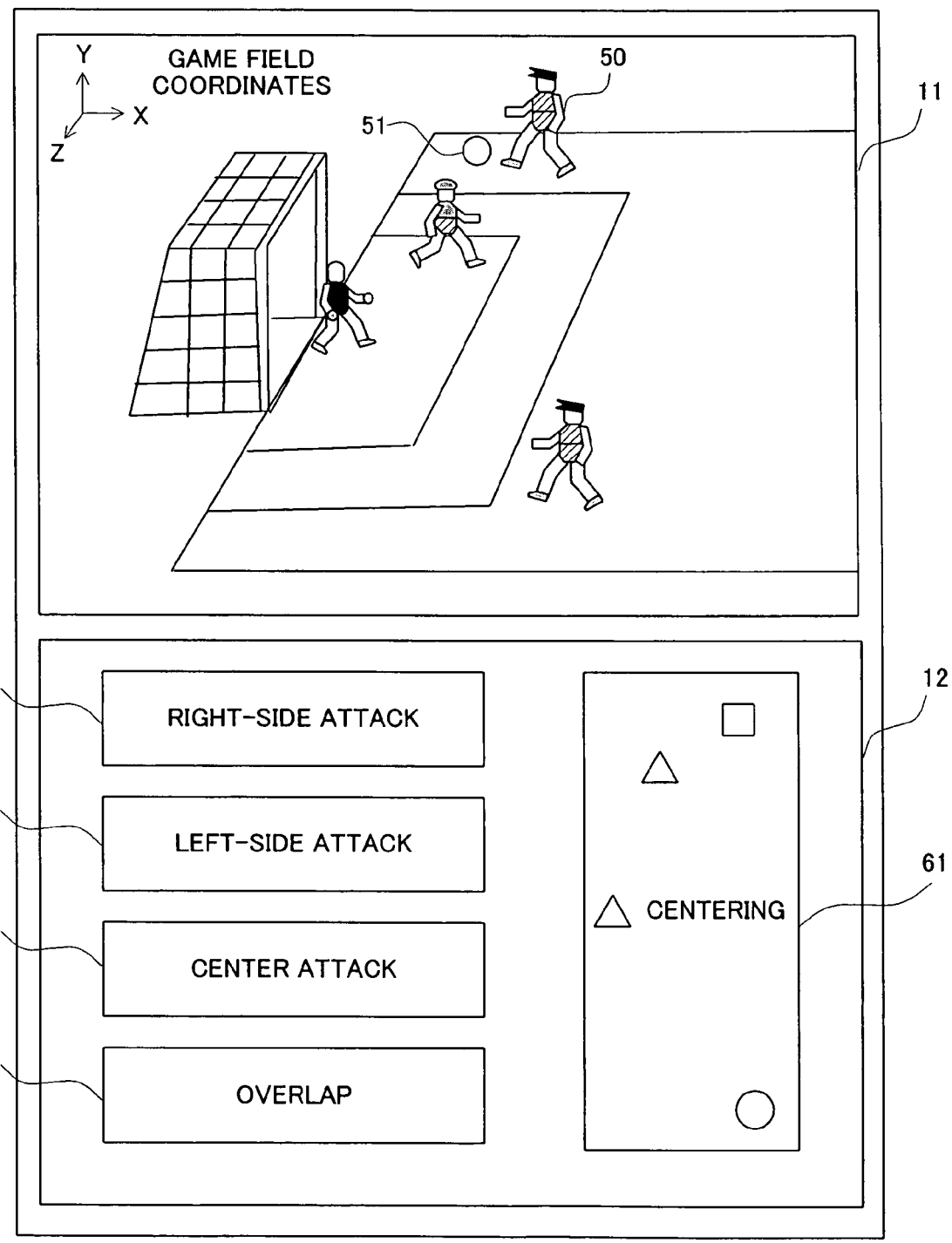
FIG. 9 shows examples of display images on the first and second LCDs 11 and 12 which may be displayed when a character in possession of a ball enters the centering area.

FIG. 9 shows examples of display images on the first and second LCDs 11 and 12 which are displayed in the situation where the selected character 50 in possession of the ball 51 enters the centering area. FIG. 9 differs from FIG. 4 in that a button switch image 61 for "centering" is displayed instead of the button switch images 56a, 57, and 58. If the player touches the button switch image 61 associated with "centering", the selected character 50 makes a "centering pass". The target point for a centering pass varies depending on a portion of the button switch image 61 that is touched by the player. This is described in more detail below.

Figure 10:
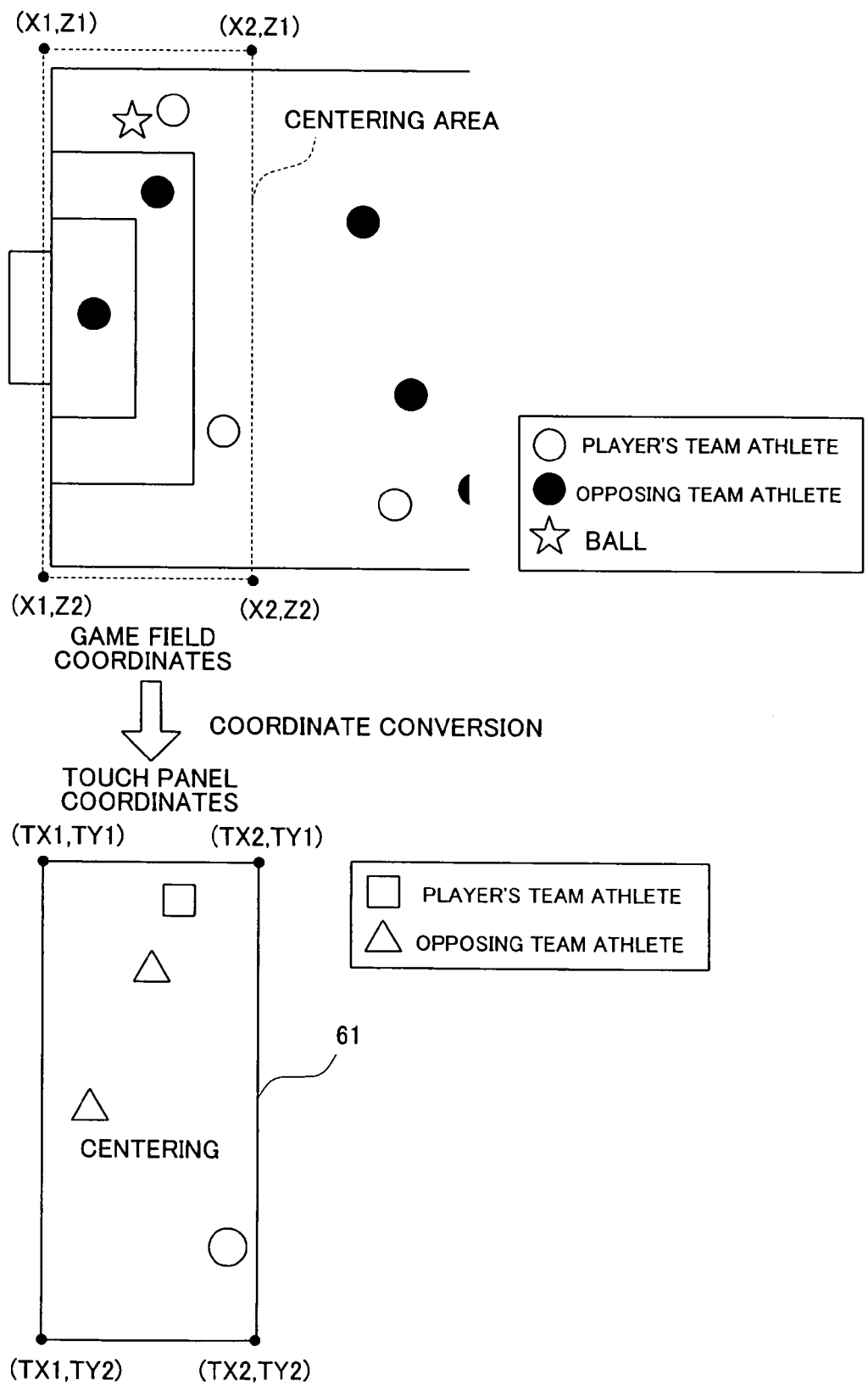
FIG. 10 is a diagram showing the correspondence between a button switch image 61 and a game field.

As shown in FIG. 10, each point in the button switch image 61 for "centering" is associated with a point within the centering area in the game field. Specifically, touch panel coordinates (TX1,TY1) corresponding to a point on the top left corner of the button switch image 61 on the second LCD 12 is associated with game field coordinates (X1,Z1) of a point on the top left corner of the centering area in the game field, and touch panel coordinates (TX2,TY1) corresponding to a point on the top right corner of the button switch image 61 is associated with game field coordinates (X2,Z1) of a point on the top right corner of the centering area. Also, touch panel coordinates (TX1,TY2) corresponding to a point on the bottom left corner of the button switch image 61 is associated with game field coordinates (X1,Z2) of a point on the bottom left corner of the centering area, and touch panel coordinates (TX2,TY2) corresponding to a point on the bottom right corner of the button switch image 61 is associated with game field coordinates (X2,Z2) of a point on the bottom right corner of the centering area. Also, in the touch panel coordinate system, the horizontal direction corresponds to the X-axis direction, and the vertical direction corresponds to the Y-axis direction. Further, each point within an area enclosed by coordinate points (TX1,TY1), (TX2,TY1), (TX1,TY2), and (TX2,TY2) in the touch panel coordinate system is associated with a point within the area enclosed by coordinate points (X1,Z1), (X2,Z1), (X1,Z2), and (X2,Z2) in the game field coordinate system, so as to establish linear relationships between game field coordinates in the centering area and their corresponding touch panel coordinates in the button image. As such, each point in the button switch image 61 is associated with a point in the game field coordinate system. For example, if the player touches a point (TX1,TY1) on the touch panel 16, the selected character 50 makes a centering pass aiming at point (X1,Z1) in the game field as a target point. Note that in the game field coordinate system, a direction of a touch line corresponds to the X-axis direction, a direction of a goal line corresponds to the Y-axis direction, and a vertical direction corresponds to the Z-axis direction.

As shown in FIG. 10, the button switch image 61 for "centering" includes marks indicating the player's team athletes and the opposing team athletes (and also includes a mark indicating the position of a ball). The position of a mark for each athlete within the centering area in the game field is obtained by performing coordinate conversion from game field coordinates to touch panel coordinates. The coordinate conversion between the touch panel coordinates and the game field coordinates can be readily implemented based on the aforementioned correspondences. In this manner, positions of the player's team athletes and the opposing team athletes within the centering area are displayed in the button switch image 61, therefore the player can reference the displayed marks to allow the selected character 50 to make a "centering pass" toward an optimum target point with consideration of the position of each athlete. Although it is not always necessary but preferable to display marks indicating athletes in the button switch image 61 for reasons as described above. Also, instead of displaying marks indicating positions of athletes, an image or a uniform number may be displayed for each athlete.

Figure 11:
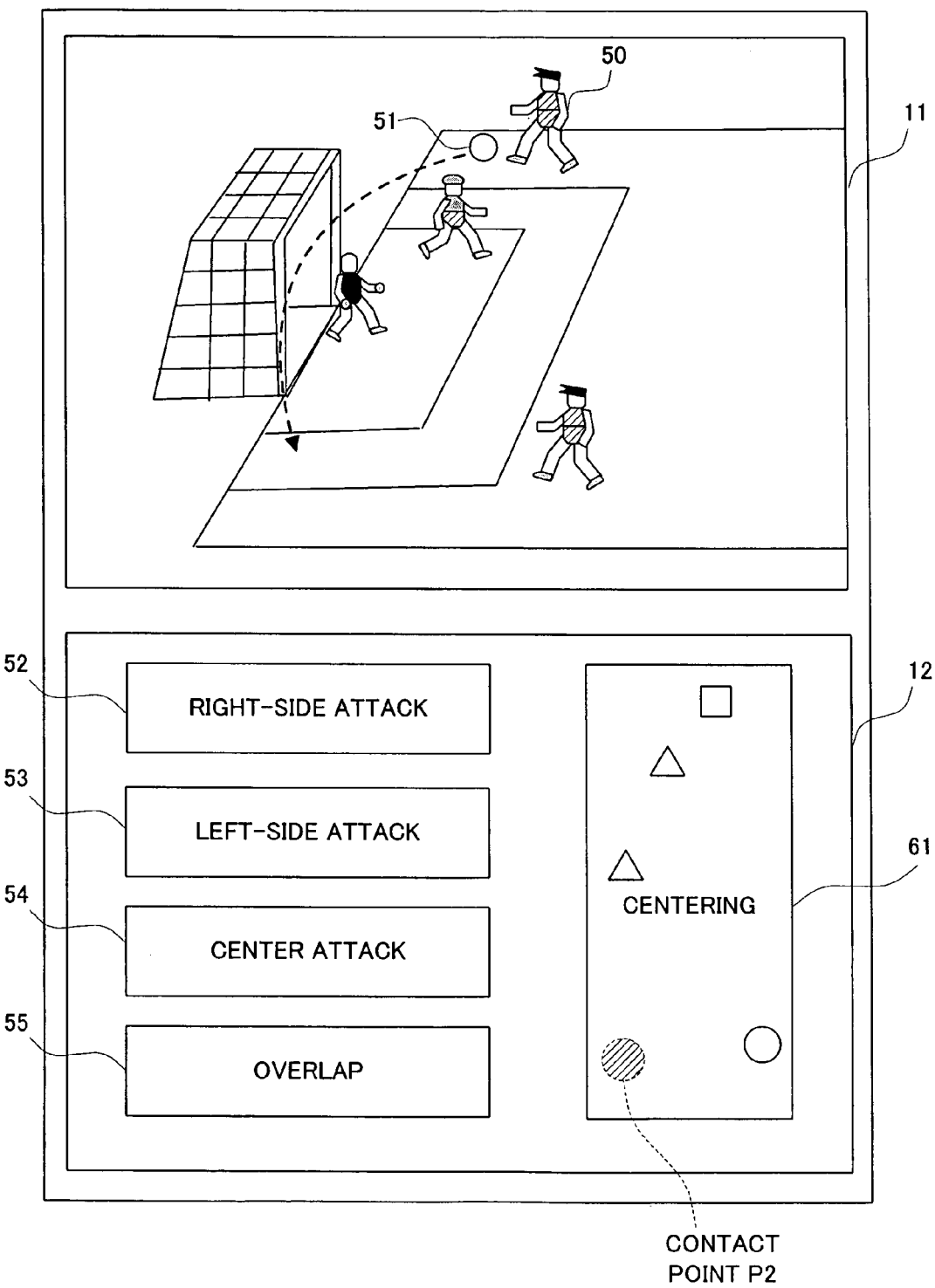
FIG. 11 shows other examples of display images on the first and second LCDs 11 and 12 which may be displayed when a character in possession of a ball enters the centering area.
Figure 12:
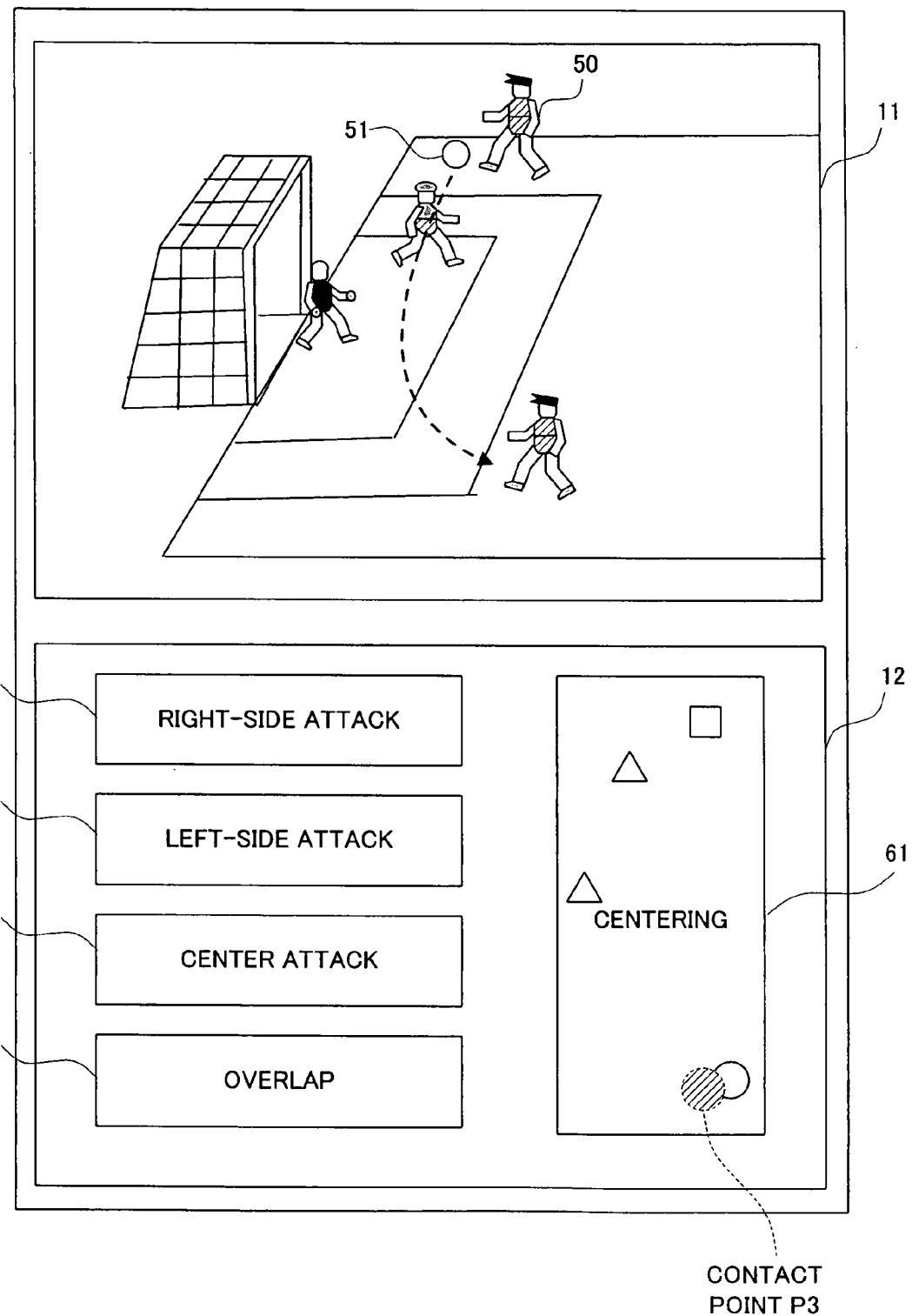
FIG. 12 shows still other examples of display images on the first and second LCDs 11 and 12 which may be displayed when a character in possession of a ball enters the centering area.
Figure 13:
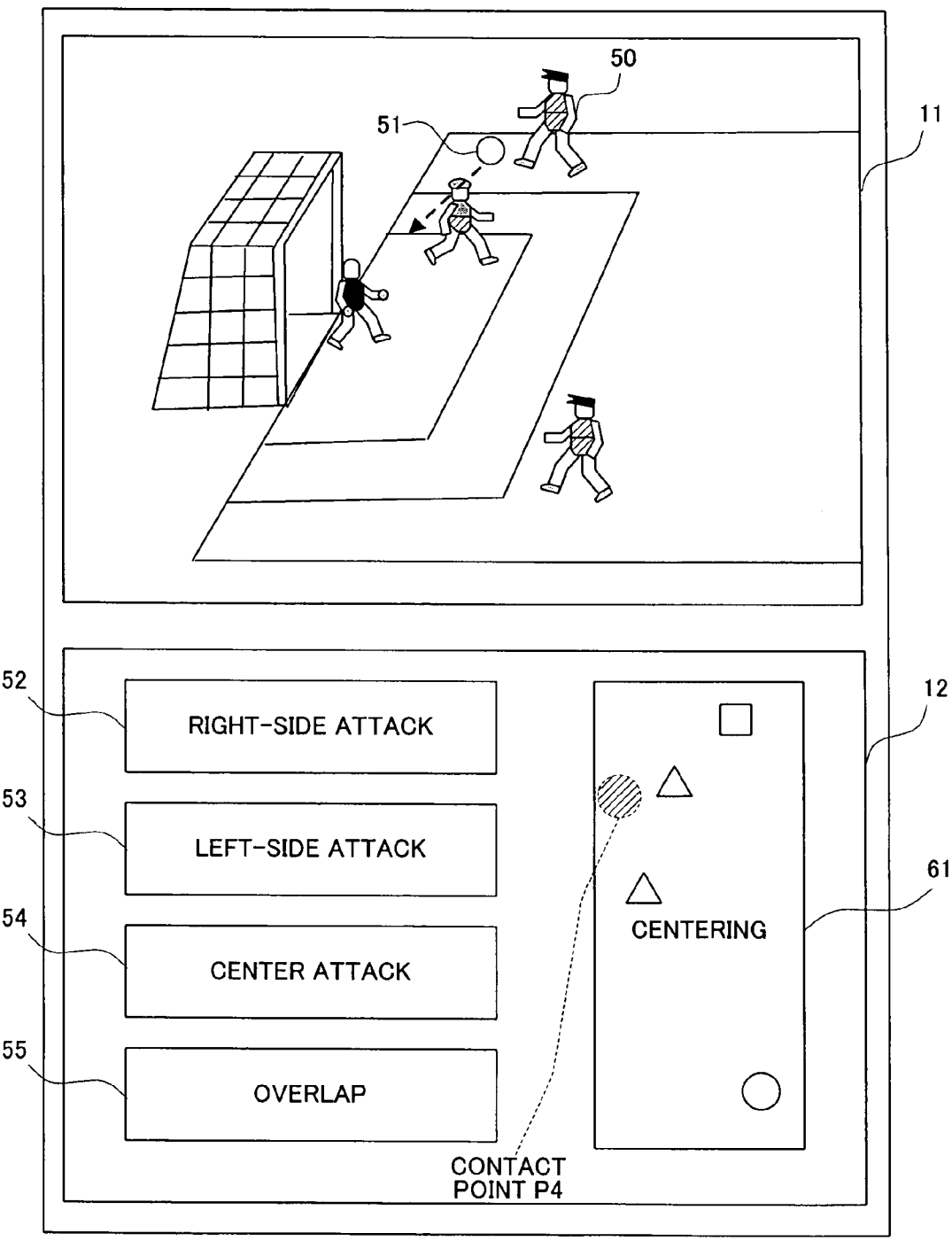
FIG. 13 shows still other examples of display images on the first and second LCDs 11 and 12 which may be displayed when a character in possession of a ball enters the centering area.

FIG. 11 shows other examples of display images on the first and second LCDs 11 and 12 which are displayed when the selected character 50 enters the centering area. If the player touches contact point P2 shown in FIG. 11, game field coordinates of a target point for centering are obtained based on touch panel coordinates of contact point P2, and the selected character 50 makes a "centering pass" toward this target point (see the arrow shown in FIG. 11). Similarly, if the player touches contact point P3 shown in FIG. 12, the selected character 50 makes a "centering pass" toward a target point corresponding to contact point P3 (see the arrow shown in FIG. 12). Also, if the player touches contact point P4 shown in FIG. 13, the selected character 50 makes a "centering pass" toward a target point corresponding to contact point P4 (see the arrow shown in FIG. 13). Accordingly, even a player who is not accustomed to operating the game can readily allow the selected character 50 to make a "centering pass" toward a desired target point. Further, the player can simultaneously provide an instruction concerning "centering" and an instruction concerning the target point by touching the button switch image 61 associated with "centering" only once, and therefore it is possible to quickly enter instructions adapted to real-time progression of the game. Furthermore, marks associated with a displayed region of the button switch image 61 and showing where game characters (athlete characters) are located in the game field are displayed in the button switch image 61, and therefore even a beginner is able to carry out an intuitive operation in a simple manner because it is possible to make a "centering pass" toward an athlete character in the player's team by, for example, touching the mark of that player character as shown in FIG. 12.

A point in the game field may be selected as a target point for centering in accordance with a contact point on the button switch image 61. Or, it may be so configured that a centering pass is made to a player character displayed in the button switch image 61 when a mark indicating that player character is touched.

Figure 14:
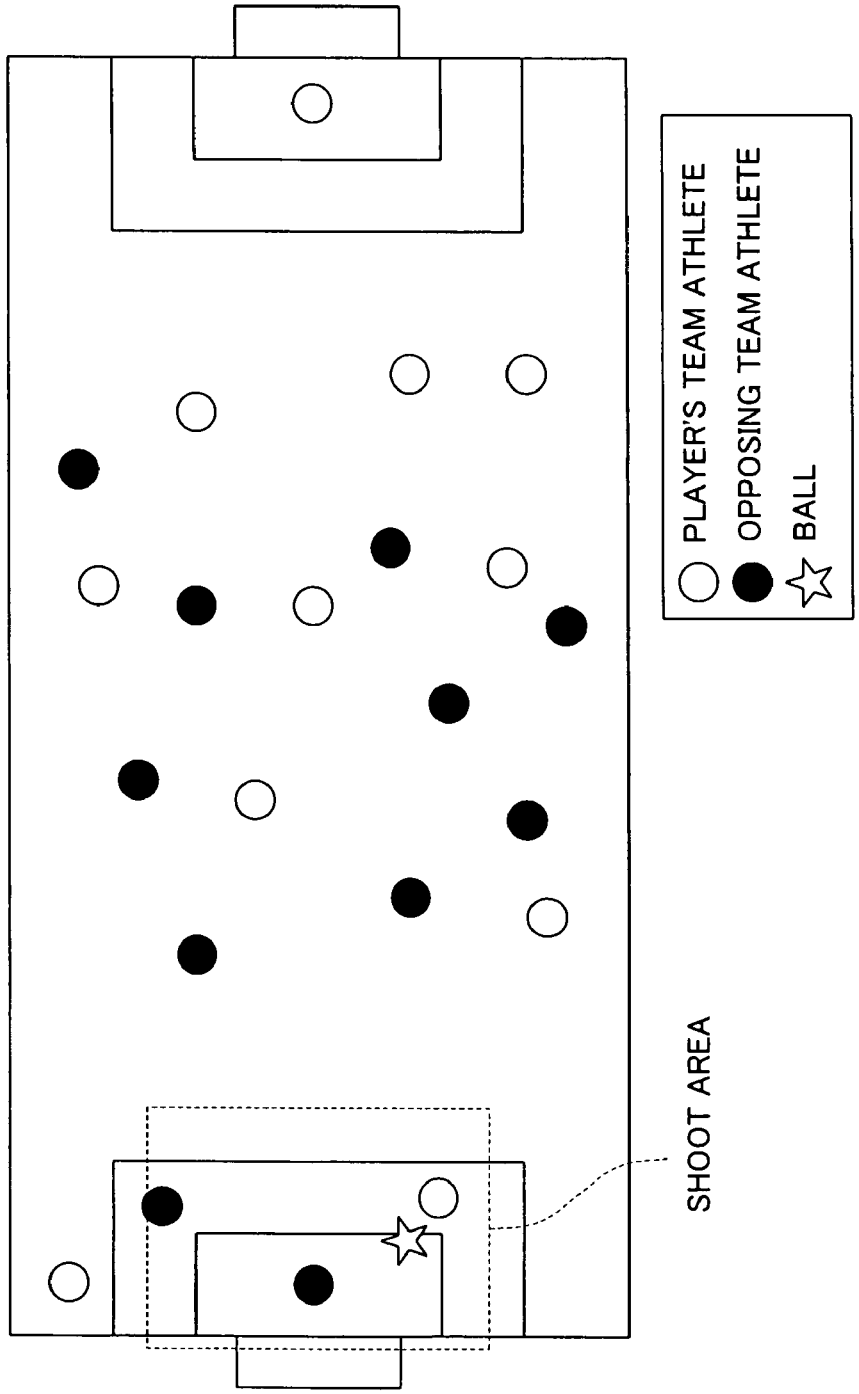
FIG. 14 is a diagram showing a shoot area.

Described next is a case where the selected character 50 in possession of the ball whose position is a forward (FW) enters a shoot area. FIG. 14 is a conceptual diagram showing the game situation in such a case. In FIG. 14, the shoot area is indicated by broken lines.

Figure 15:
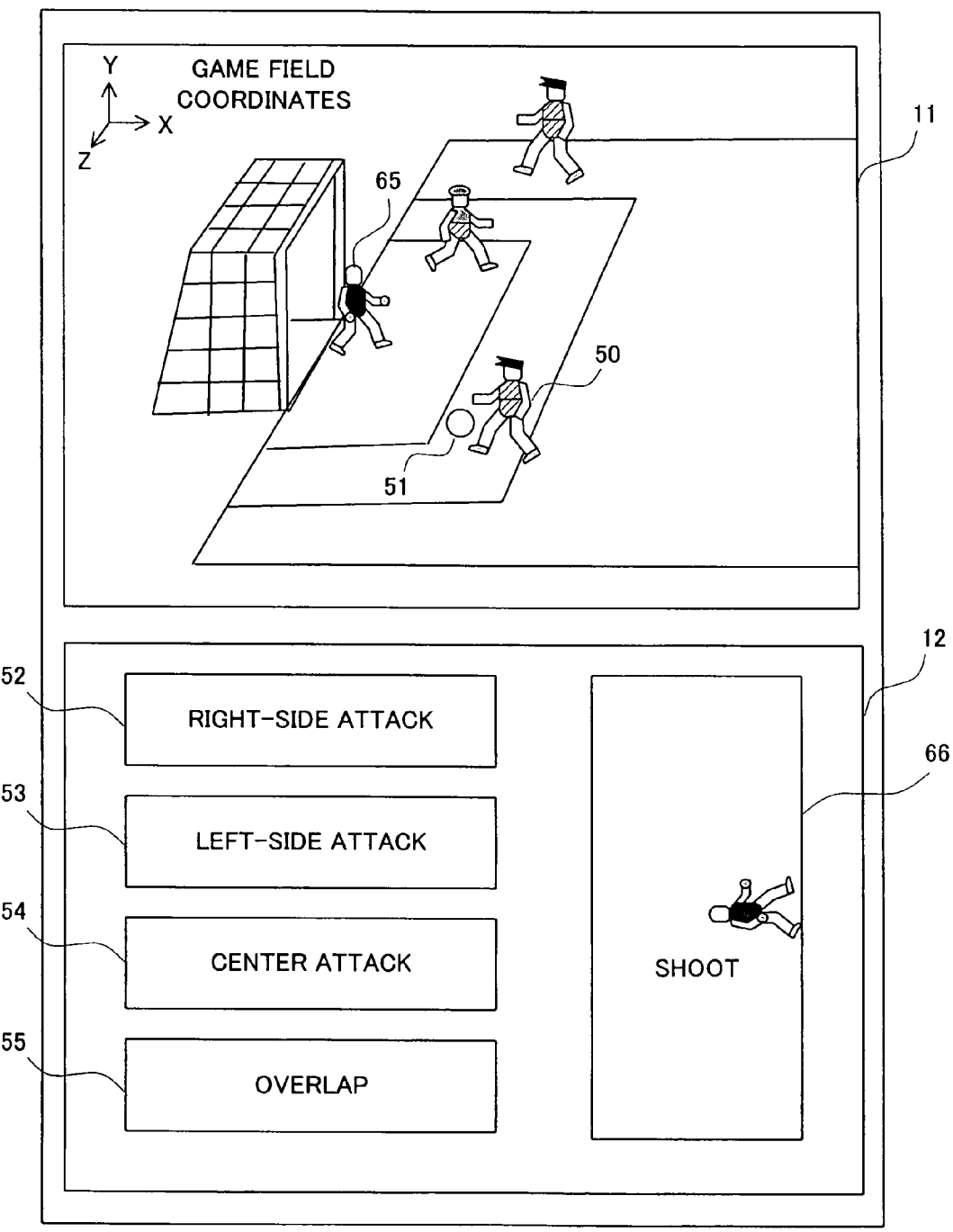
FIG. 15 shows examples of display images on the first and second LCDs 11 and 12 which may be displayed when a character in possession of a ball enters the shoot area.

FIG. 15 shows examples of display images on the first and second LCDs 11 and 12 which are displayed in the situation where the selected character 50 in possession of the ball 51 enters the shoot area. FIG. 15 differs from FIG. 9 in that a button switch image 66 for "shoot" is displayed instead of the button switch image 61. If the player touches the button switch image 66 associated with "shoot", the selected character 50 takes a shot. A target point for shoot (toward which a shot ball travels) varies depending on a portion of the button switch image 66 that is touched by the player. This is described in more detail below.

Figure 16:
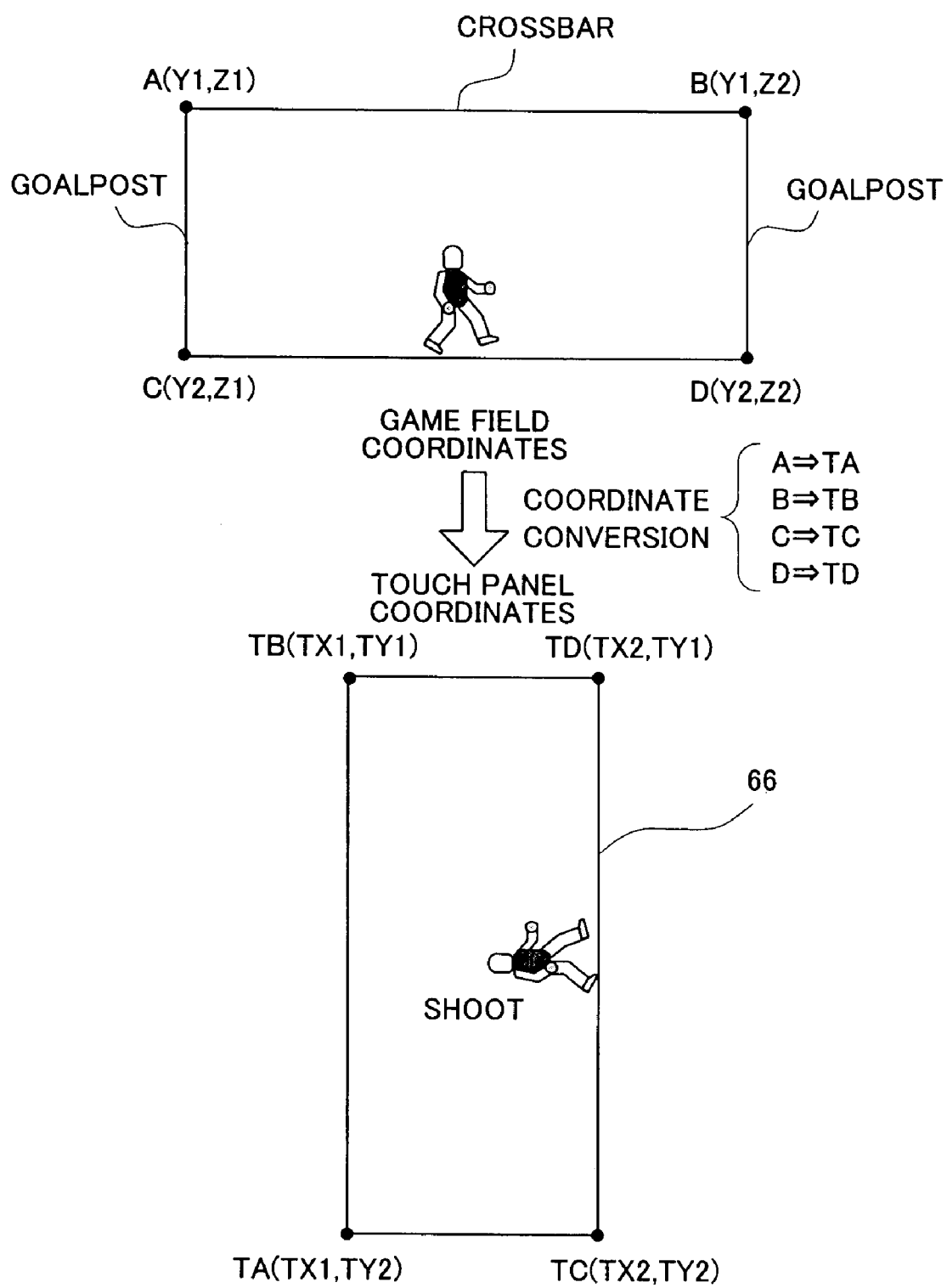
FIG. 16 is a diagram showing a correspondence between a button switch image 66 and a game field.

As shown in FIG. 16, each point within the button switch image 66 for "shoot" corresponds to a point in a goal mouth area in the game field (an area enclosed by a crossbar, goalposts, and the ground in a vertical plane including an end line. For example, point A (Y1,Z1) in the game field coordinate system corresponds to point TA (TX1,TY2) in the touch panel coordinate system, and point B (Y1,Z2) in the game field coordinate system corresponds to point TB (TX1,TY1) in the touch panel coordinate system. Other two points in the game field coordinate system shown in FIG. 16 have a similar correspondence with a point in the touch panel coordinate system. Also, each point within the goal mouth area is associated with a corresponding point in the touch panel coordinate system, so as to establish linear relationships between game field coordinates in the goal mouth area and their corresponding touch panel coordinates in the button image. For example, if the player touches point TA (TX1,TY2) on the touch panel 16, point A (Y1,Z1) in the game field is obtained as a corresponding coordinate point, so that the selected character 50 makes a shoot toward a point at game field coordinates (Xe,Y1,Z1), where Xe is an X-coordinate on the end line.

As shown in FIG. 16, in the button switch image 66 for "shoot" is displayed an image of a keeper 65 in the opposing team. The position of the image of the keeper 65 in the button switch image 66 is obtained by converting the game field coordinates of the keeper 65 in the game field to touch panel coordinates. More preferably, the image of the keeper 65 is located in a position corresponding to the position of the keeper 65 when the goal mouth area is viewed from the selected character 50. The position of the keeper 65 can be obtained by simple coordinate conversion. As such, the position of the keeper 65 can be obtained based on the button switch image 66, therefore the player can reference the displayed image of the keeper 65 to allow the selected character 50 to make a "shoot" toward an optimum target point with consideration of the position of the keeper 65. Although it is not always necessary but preferable to display the image of the keeper 65 in the button switch image 66 for reasons as described above. Also, instead of displaying the image of the keeper 65, an image, name, or uniform number of the keeper 65 may be displayed. Also, not only the image of the keeper 65 but also images of other athletes may be displayed in the button switch image 66. Also, as shown in FIG. 16, the button switch image 66 is displayed such that the left end of the button switch image 66 corresponds to the crossbar in the game field, and the right end of the button switch image 66 corresponds to the ground in the game field. However, the button switch image 66 may be displayed in a different manner. For example, the button switch image 66 may be displayed such that the top end of the button switch image 66 corresponds to the crossbar in the game field, and the bottom end of the button switch image 66 corresponds to the ground in the game field.

Figure 17:
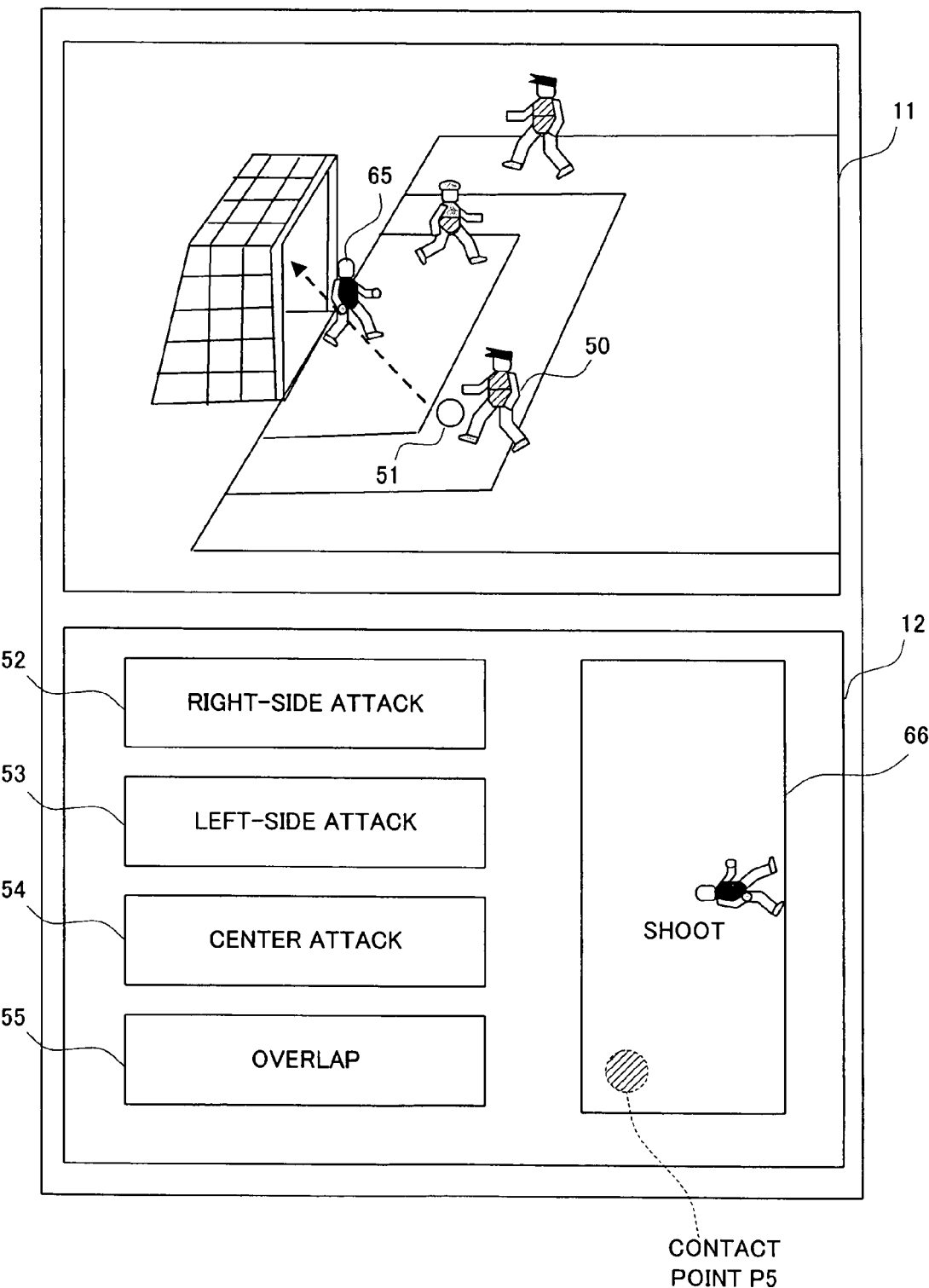
FIG. 17 shows other examples of display images on the first and second LCDs 11 and 12 which may be displayed when a character in possession of a ball enters the shoot area.
Figure 18:
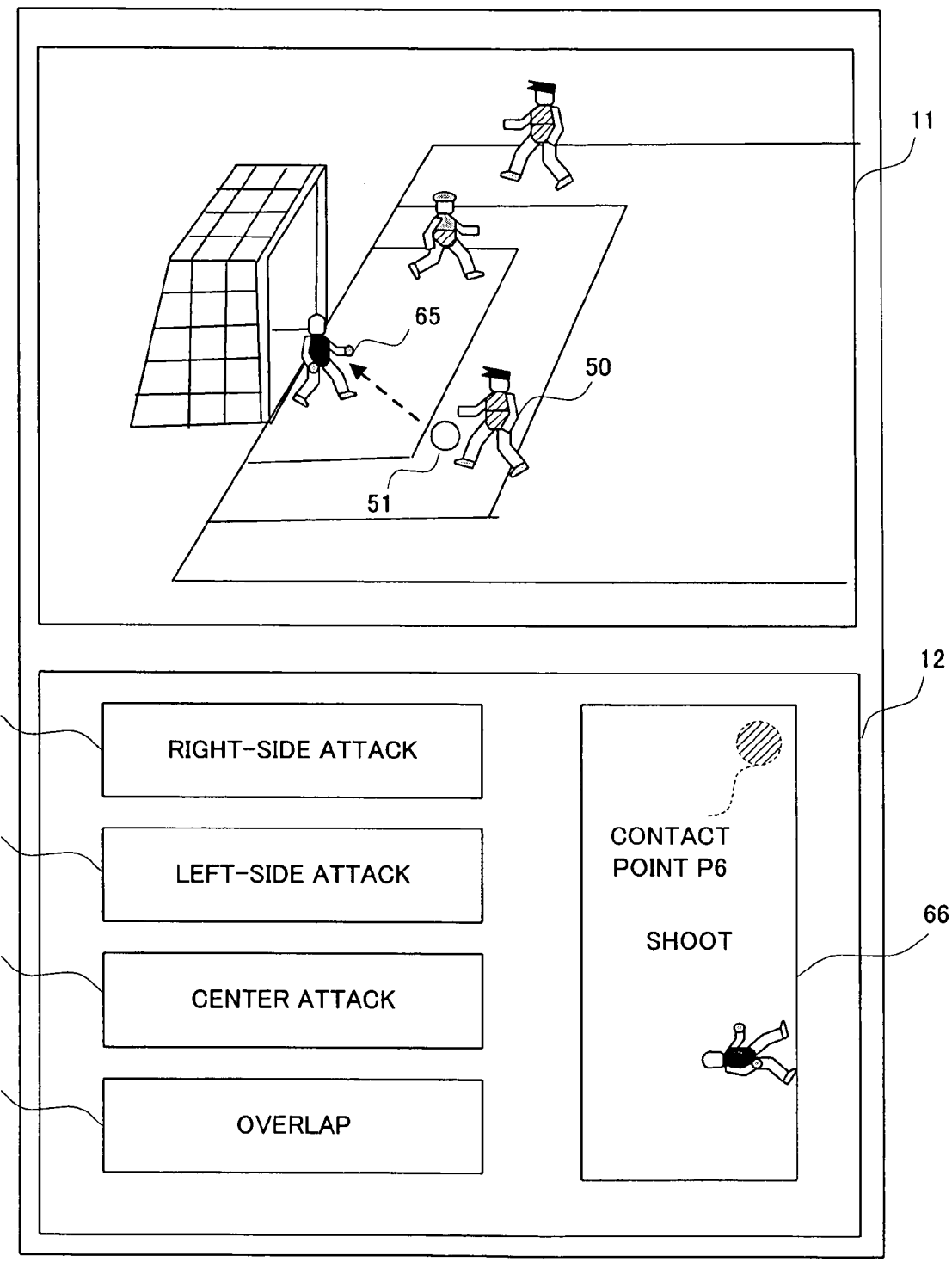
FIG. 18 shows still other examples of display images on the first and second LCDs 11 and 12 which may be displayed when a character in possession of a ball enters the shoot area.

FIG. 17 shows other examples of display images on the first and second LCDs 11 and 12 which are displayed in the situation where the selected character 50 enters the shoot area. If the player touches contact point P5 shown in FIG. 17, game field coordinates of a shoot target point is obtained based on touch panel coordinates of contact point P5, and the selected character 50 takes a shot toward this target point (see the arrow shown in FIG. 17). Similarly, if the player touches contact point P6 shown in FIG. 18, the selected character 50 makes a "shoot" toward a target point corresponding to contact point P6 (see the arrow in FIG. 18). In this manner, even a player who is not accustomed to operating the game can readily allow the selected character 50 to take a shot toward a desired target point. Further, the player can simultaneously provide an instruction to "shoot" and an instruction as to the target point by touching the button switch image 66 associated with "shoot" only once, therefore it is possible to quickly enter instructions adapted to real-time progression of the game.

Figure 19:
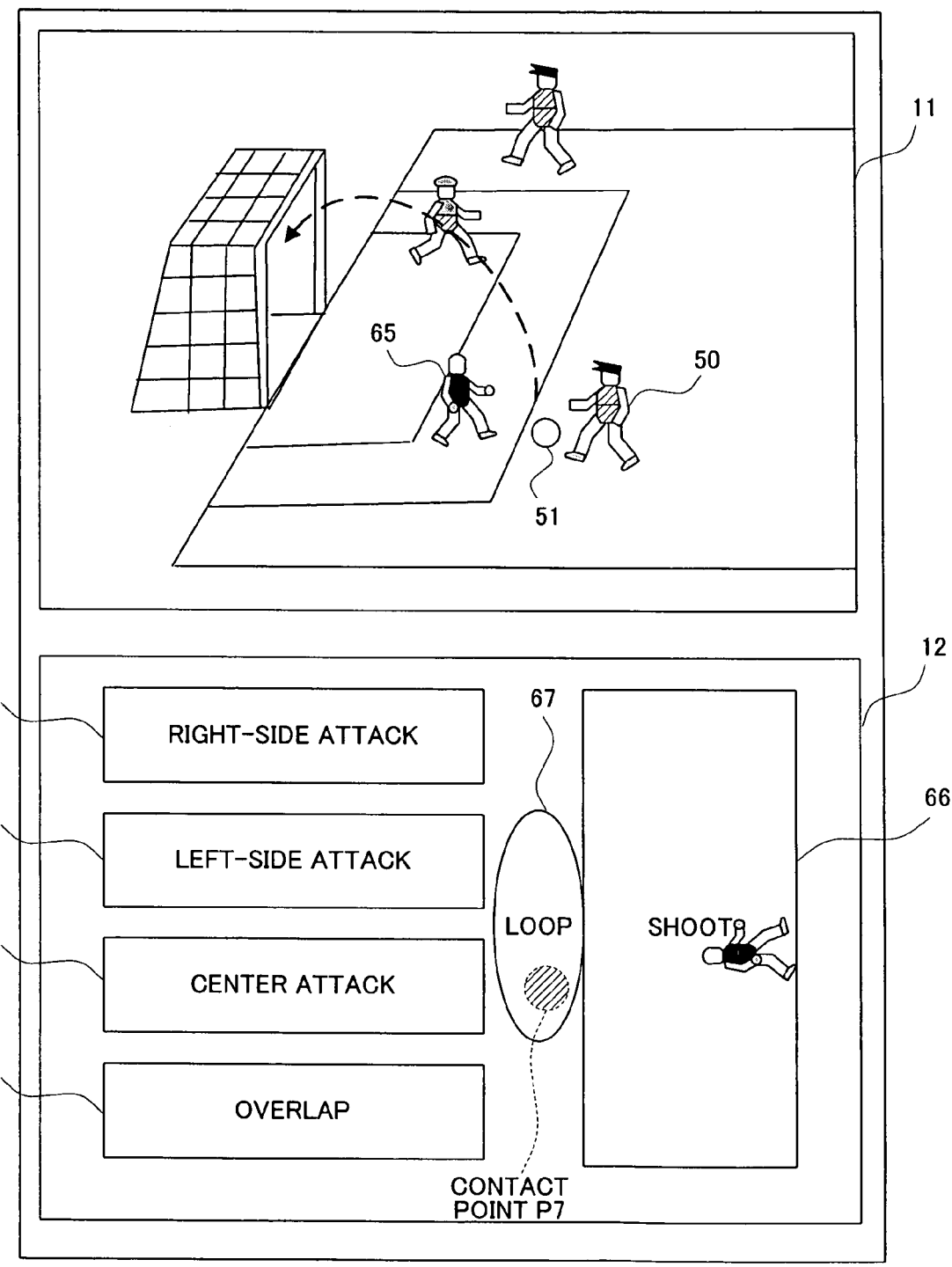
FIG. 19 shows still other examples of display images on the first and second LCDs 11 and 12 which may be displayed when a character in possession of a ball is able to make a loop shoot.

If the keeper 65 in the opposing team moves away from the goal and close to the selected character 50 (for example, the keeper moves out of the goal area), as shown in FIG. 19, a button switch image 67 associated with "loop shoot" is additionally displayed in the touch panel image. Here, the term "loop shoot" refers to a shoot which allows the ball 51 to travel over the head of the keeper 65 while drawing a gentle curve. Accordingly, in the example of FIG. 19, in order to allow an intuitive operation, the button switch image 67 associated with "loop shoot" is located on the left to the button switch image 66 (i.e., over the head of the keeper displayed in the button switch image 66). However, the button switch image 67 may be located in another position. If the player touches contact point P7 shown in FIG. 19, game field coordinates of the target point for a loop shot are obtained based on touch panel coordinates of contact point P7, and the selected character 50 makes a "loop shoot" toward the target point (see the arrow in FIG. 19). In this manner, by displaying a button switch image depending on the situation, it is made possible to allow the player to become aware of the situation where the button switch should be depressed (or can be used). It is also made possible to cause the button switch image not to be displayed if it is not necessary, and to prevent the number of types of button switch images that are displayed at the same time from increasing, thereby preventing the mix-up of the operation.

Figure 20:
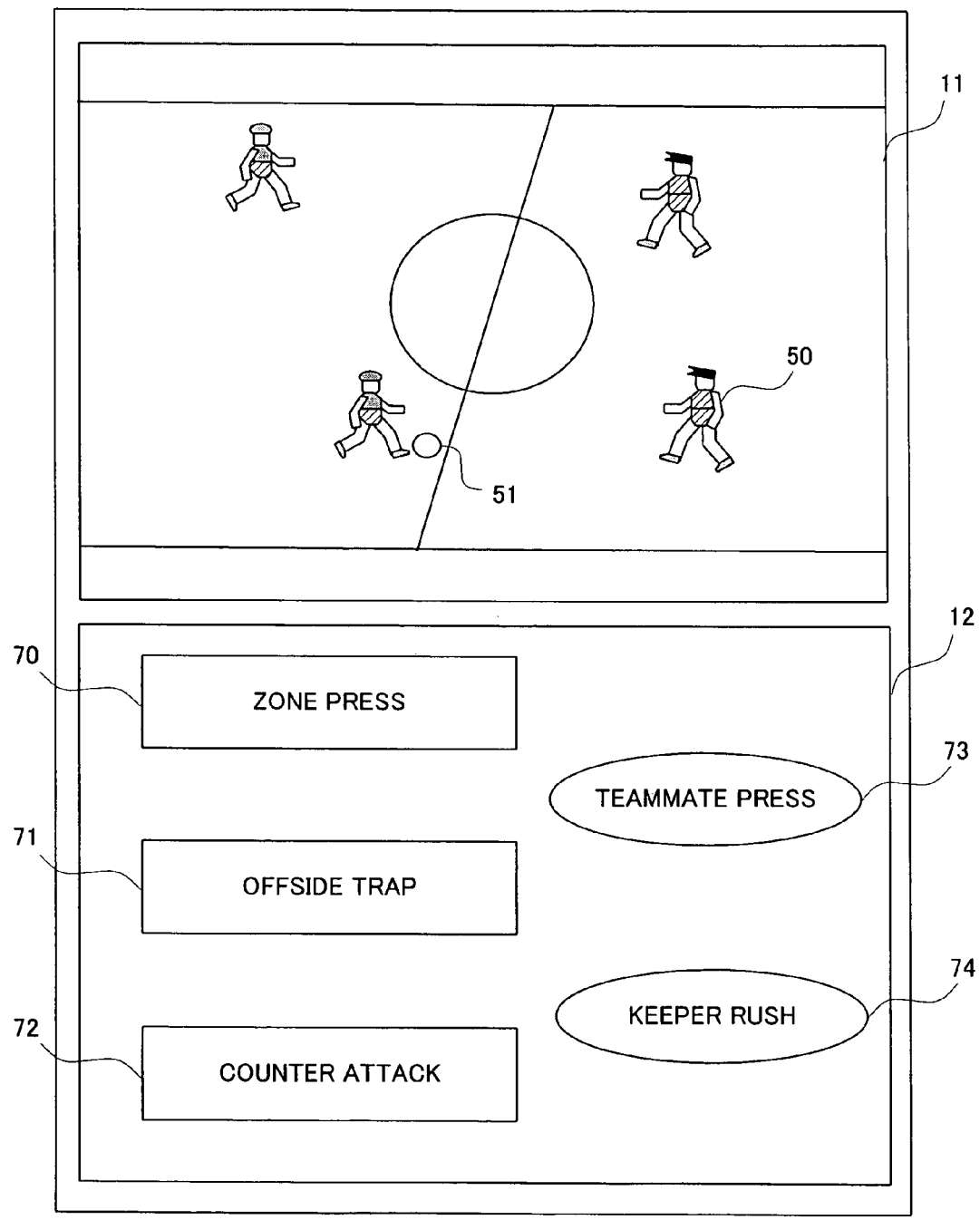
FIG. 20 shows examples of display images on the first and second LCDs 11 and 12 which may be displayed during defense.

FIG. 20 shows examples of display images on the first and second LCDs 11 and 12 which are displayed in the situation where the opposing team keeps the ball (i.e., the player's team is on defense). In FIG. 20, rectangular button switch images for entering instructions concerning the offensive strategy of the player's team have been changed to those for use in defense. Also, in addition to the rectangular button switch images 70-72, oval button switch images 73 and 74 are displayed. The button switch image 73 is intended for allowing an athlete in the player's team that is closest to the ball 51 to move toward the opposing team's athlete that keeps the ball 51. Also, the button switch image 74 is intended for allowing the keeper in the player's team to move toward the opposing team's athlete that keeps the ball 51 (for example, an athlete which attempts to make a shot). In this manner, the touch panel image that is to be displayed on the second LCD 12 varies depending on whether the player's team is on offense or defense.

FIG. 21 shows examples of display images on the first and second LCDs 11 and LCD 12 which are displayed in the case of a corner kick. Here, the touch panel image includes four button switch images 75a-75d. The button switch images 75a-75d change in an animated manner, and are intended for representing by animation how athletes in the player's team move and how a ball 51 kicked from a corner travels immediately after the selected character 50 kicks the ball 51 (i.e., immediately after the corner kick). The player sees the animated representation of each of the button switch images 75a-75d, and touches a button switch image corresponding to a desired formation with the stick 17 or a finger. Thereafter, the ball kicked from the corner moves as shown in the touched button switch image, and each athlete in the game field moves as shown in the touched button switch image. After the corner kick, the player is able to control the action of the selected character by using the cross key, A button, B button, etc. Also, non-selected characters move as usual in accordance with a program after they move as shown in the touched button switch image. In this manner, details of each formation which can be selected by the player are shown by animation during a set play such as a corner kick or a free kick. Accordingly, the player can readily recognize and select even a complicated formation.

In the example of FIG. 21, each of the button switch images 75a-75d is displayed by animation, though still images simply showing a formation may be used. However, it is preferable to employ animated representations for the sake of easily understanding the formations.

Hereinbelow, data in the ROM 180 of the game cartridge 18 which is used for executing the above-described game is described.

Figure 22:
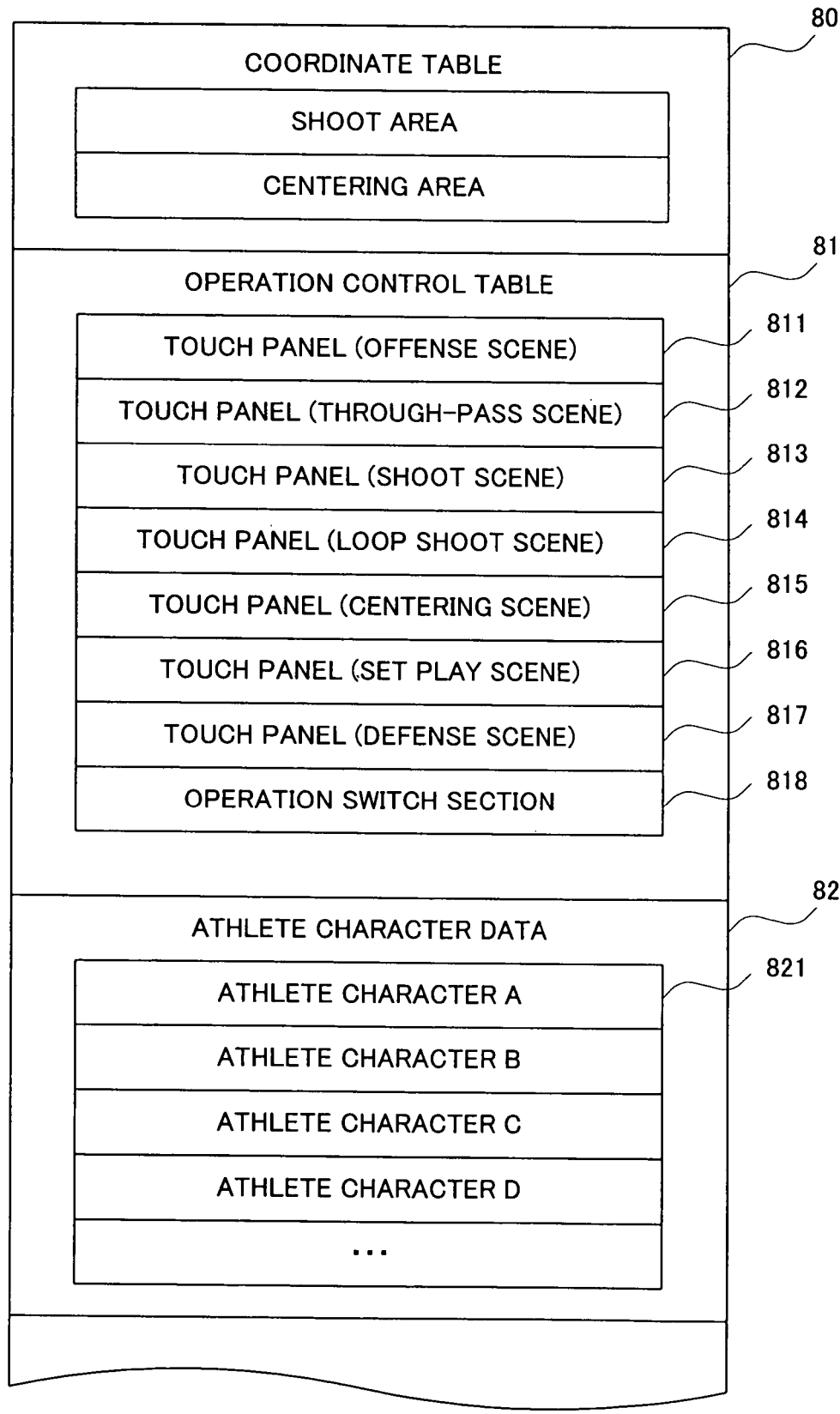
FIG. 22 shows a portion of a memory map of a ROM 180.
Figure 23:
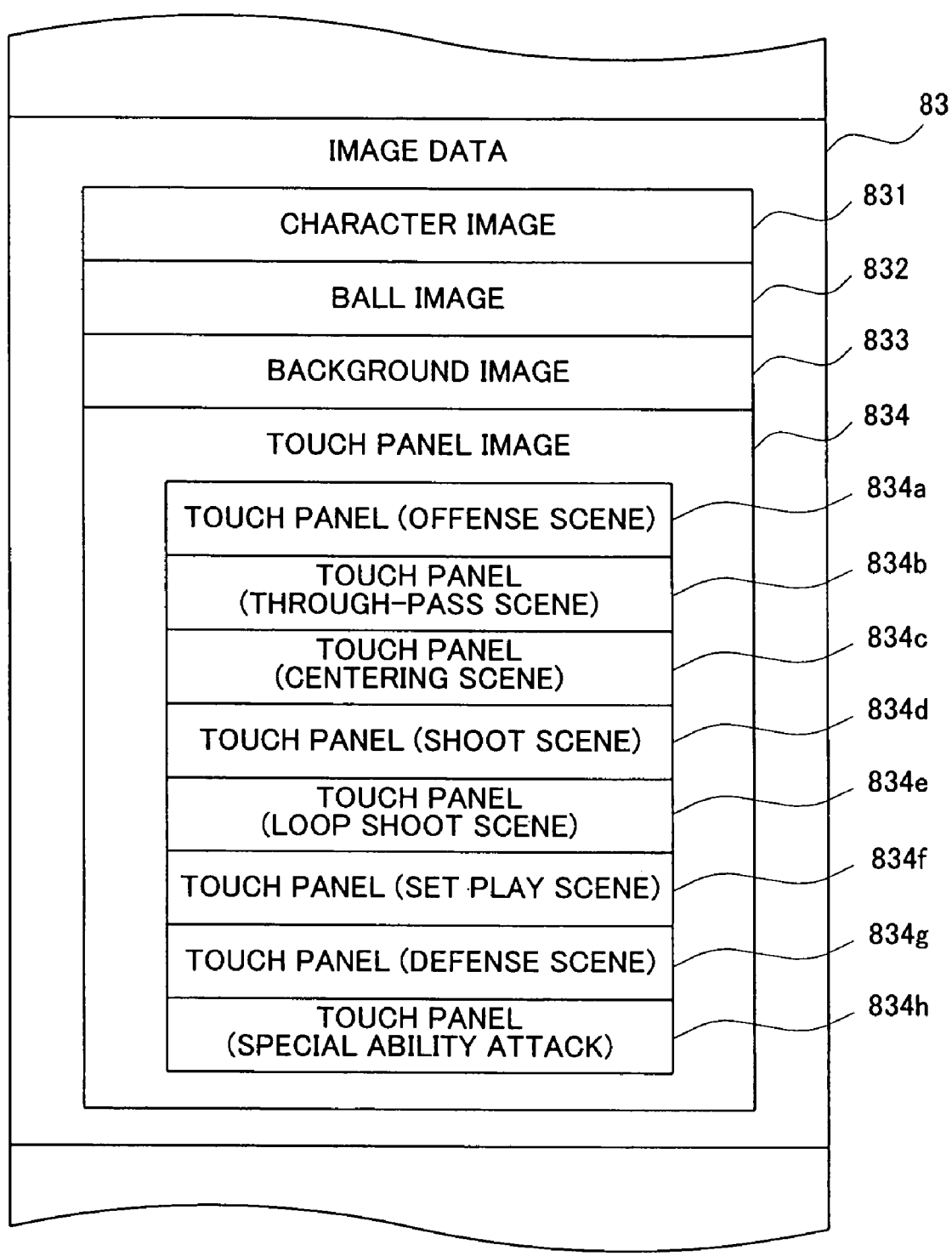
FIG. 23 shows another portion of the memory map of the ROM 180.
Figure 24:
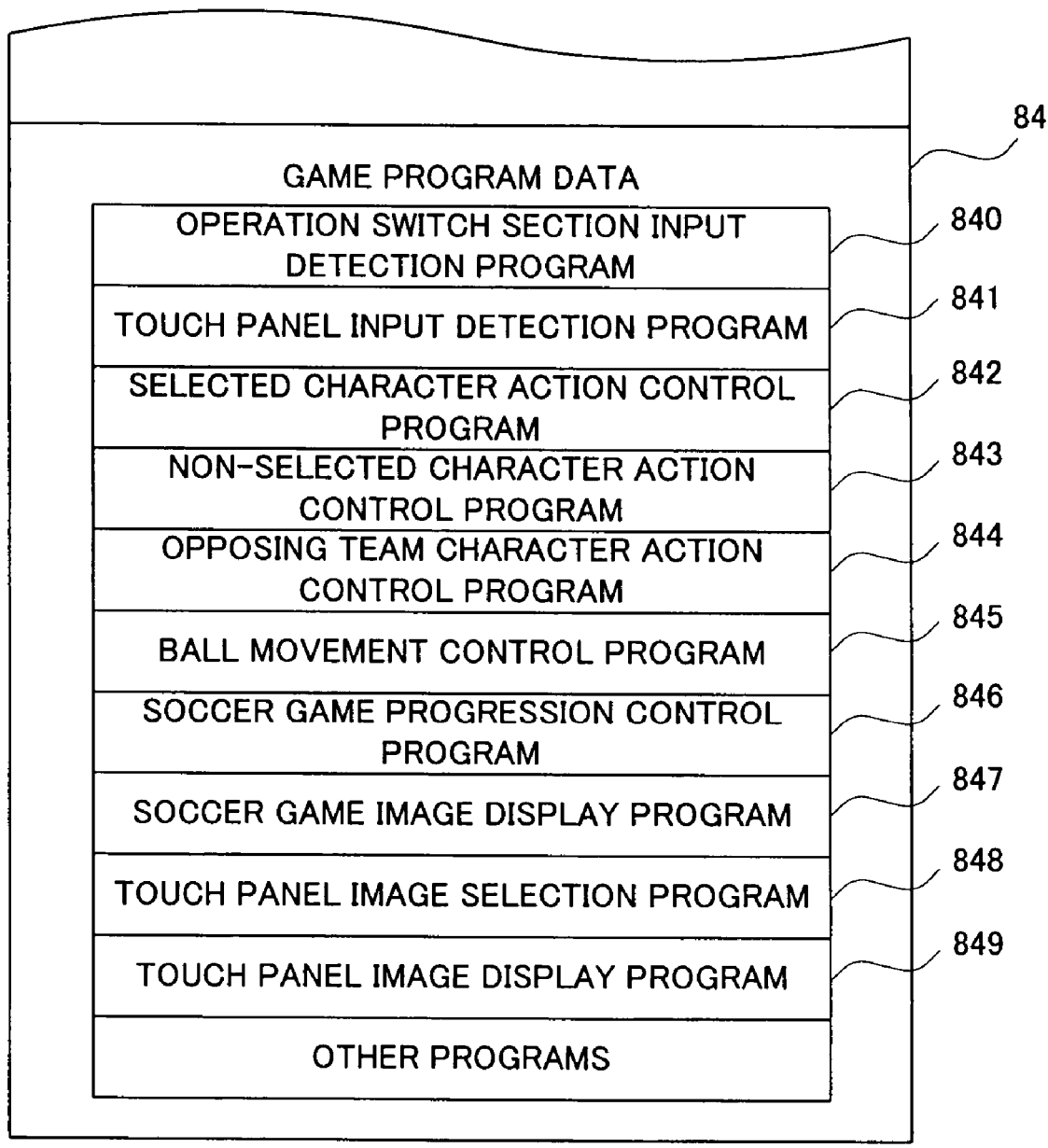
FIG. 24 shows still another portion of the memory map of the ROM 180.

FIGS. 22-24 are memory maps of the ROM 180. The ROM 180 has stored therein a coordinate table 80, an operation control table 81, player character data 82, image data 83, game program data 84, etc.

The coordinate table 80 is data which defines ranges of the shoot area and the centering area in the game field.

The operation control table 81 is data for interpreting the player's operation on the operation switch section 15 and the touch panel 16. The operation control table 81 is roughly divided into operation control tables 811-817, which define control details when the touch panel 16 is operated, and an operation control table 818 which defines control details when the operation switch section 15 is operated. Further, as described above, the touch panel image changes depending on the game situation or character attribute values, and therefore the operation control tables 811-817 are provided in order to be adapted to the change of the touch panel image.

FIG. 25 shows an exemplary operation control table 811 for offensive scene. The operation control table 811 is associated with the touch panel image shown in FIG. 4 (the image displayed on the second LCD 12). The operation control table 811 shows the correspondence between each region of the touch panel 16 (that corresponds to a button) and a control detail. The control detail is determined based on both contact point coordinate data outputted from the touch panel 16 and the operation control table 811. Button switch images for "right-side attack", "left-side attack", "center attack", and "overlap" are rectangular, and therefore for each button switch image, top left and top right coordinates on the touch panel coordinate system are memorized to make it possible to detect the touching of a point in the rectangular region. Also, button switch images for "through-pass", "one-two pass", "normal feint", "stepover feint", and "kick feint" are oval, and therefore center coordinates, the major axis, and the minor axis of the touch panel coordinate system are memorized to make it possible to detect that a point in the oval region is touched.

FIG. 26 shows an exemplary operation control table 818 associated with the operation switch section 15. The operation control table 818 has stored therein a single operation control table which defines control details when the operation switch section 15 is singly operated, and a simultaneous operation or sequential operation control table which defines control details when simultaneous or sequential operations are performed. Each table shows for both offense and defense modes which operation on the operation switch section 15 is associated with which control detail. Note that in FIG. 26, "+" means simultaneous depression, and marks of operation switches shown side by side mean sequential depression. For example, "fly through-pass" is executed by depressing A button immediately after R button and B button are simultaneously depressed. Also, "far-centering" is executed by depressing A button immediately after A button is depressed once.

Figure 27:
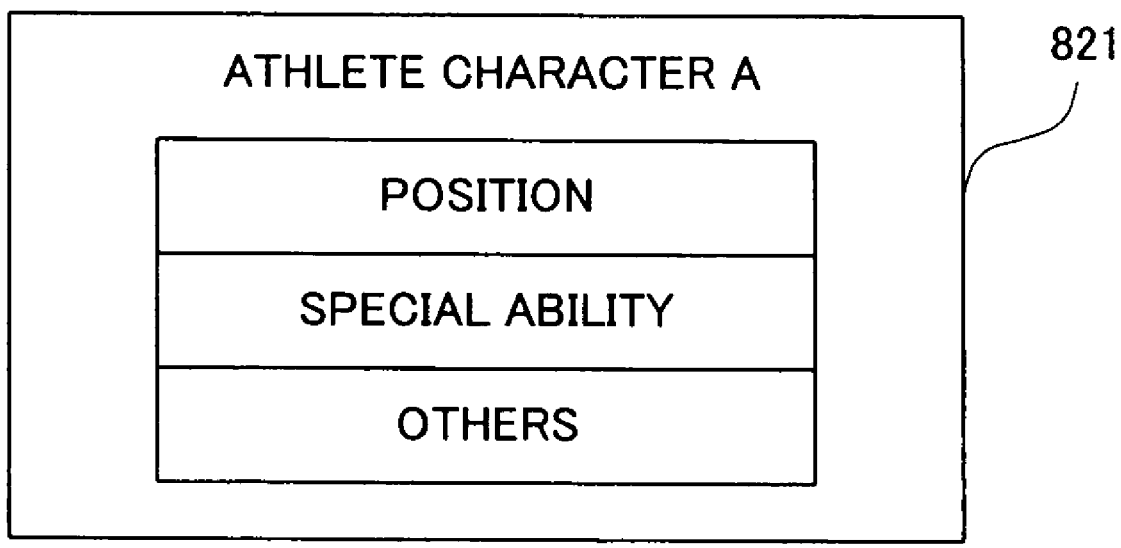
FIG. 27 shows exemplary athlete character data 821 related to athlete character A.

The athlete character data 82 is data for characterizing each athlete which appears in the game (athlete characters A, B, C, . . . ). FIG. 27 shows exemplary athlete character data 821 related to athlete character A. The athlete character data 821 includes the position of athlete character A (FW: forward, MF: midfielder, or DF: defender) special abilities, and other information (for example, name, uniform number, etc.). Examples of the special abilities include "long shoot" as shown in FIG. 7. The data shown in FIG. 27 is stored for each of the athlete characters A, B, C, . . . .

As shown in FIG. 23, examples of the image data 83 stored in the ROM 180 include a character image 831, which is image data for each athlete character, a ball image 832, which is an image of a ball, a background image 833, and a touch panel image 834. The touch panel image 834 includes a plurality of touch panel images 834a-834h associated with game situations and character attribute values. For example, the touch panel image 834g for defensive scene is an image as shown in FIG. 20. Note that the number of images included in the touch panel image 834h for special ability attack corresponds to the number of characters having a special ability. Note that although a plurality of touch panel images are previously provided in accordance with the number of game situations, this is not limiting. For example, a touch panel image may be suitably generated by arranging a combination of button switch images, which are required in accordance with a game situation, based on the operation control table shown in FIG. 25.

In FIG. 24, the game program data 84 includes a plurality of programs used for executing the game.

An operation switch section input detection program 840 is for use in detecting an input from the operation switch section 15. A touch panel input detection program 841 is for use in detecting an input from the touch panel 16. A selected character action control program 842 is for use in controlling the action of the selected character 50. A non-selected character action control program 843 is for use in automatically controlling actions of the player's team characters other than the selected character 50. An opposing team character action control program 844 is for use in automatically controlling actions of characters in the opposing team. A ball movement control program 845 is for use in controlling the movement of the ball 51.

A soccer game progression control program 846 is for use in carrying out processes associated with the progression of the soccer game, e.g., processes concerning the start and stop of the soccer game, fouls, free kicks, etc. A soccer game image display program 847 is for use in displaying a game field (including athlete characters, etc.) on the first LCD 11. A touch panel image selection program 848 is for use in selecting a touch panel image from the aforementioned touch panel images 834a-834h in accordance with the game situation. A touch panel image display program 849 is for use in displaying the selected touch panel image on the second LCD 12.

Figure 28:
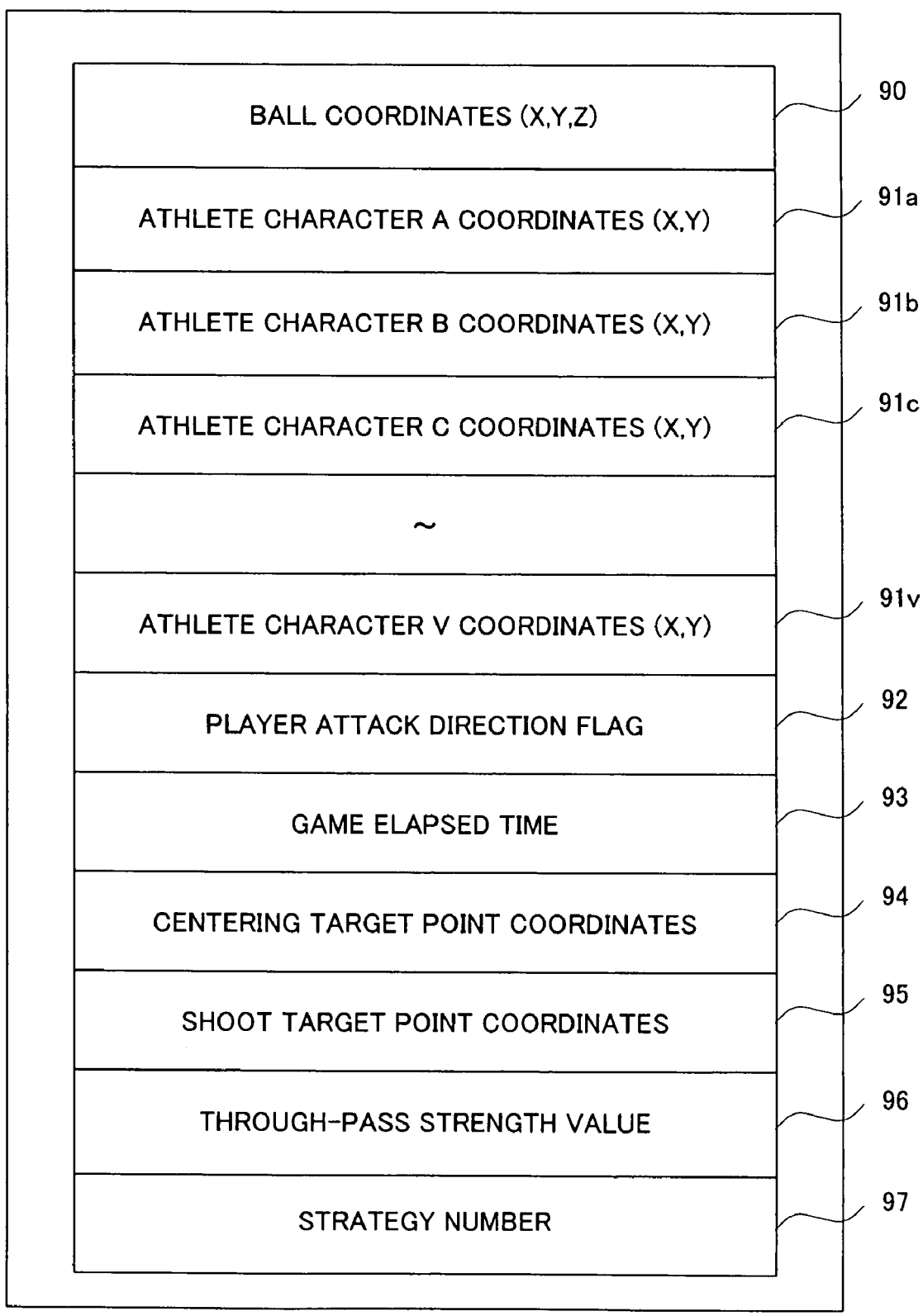
FIG. 28 is a memory map of a RAM 37.

FIG. 28 is a memory map of the RAM 37 of the hand-held game apparatus 10. Various programs as described above and data are loaded onto the RAM 37. Also, the RAM 37 temporarily stores data as shown in FIG. 28. The data is generated while the CPU core 31 is executing a game process.

Ball coordinates 90 is coordinate data which indicates the current position of the ball in the game field. Athlete character A coordinates 91a through athlete character V coordinates 91v are coordinate data which indicate the current positions of athlete characters A through V in the game field. As indicated above, a game field coordinate value is a set of three-dimensional coordinates, while each athlete character coordinate value is a set of two-dimensional coordinates. The reason why the athlete character coordinate value is represented by a set of two-dimensional coordinates is to simplify a game process, and the reason why only the ball coordinate value is represented by a set of three-dimensional coordinates is to control a ball in the air. Note that the athlete character coordinate value may be a set of three-dimensional coordinates.

A player attack direction flag 92 is data which indicates the attack direction of the player's team (for example, the direction indicated by the arrow in FIG. 8). A game elapsed time 93 is data which indicates the time elapsed from the start of the game up to the current time. Centering target point coordinates 94 is coordinate data which indicates a centering target point in the game field. Shoot target point coordinates 95 is coordinate data which indicates a shoot target point in the game field. A through-pass strength value 96 is data which indicates the strength of a through-pass which is determined as shown in FIG. 6. A strategy number 97 is an identification number which indicates a strategy currently taken by the player's team (for example, "right-side attack" is assigned with "1").

Next, flows of processes performed by CPU core 31 based on the aforementioned programs are described with reference to flowcharts in FIGS. 29-31.

Figure 29:
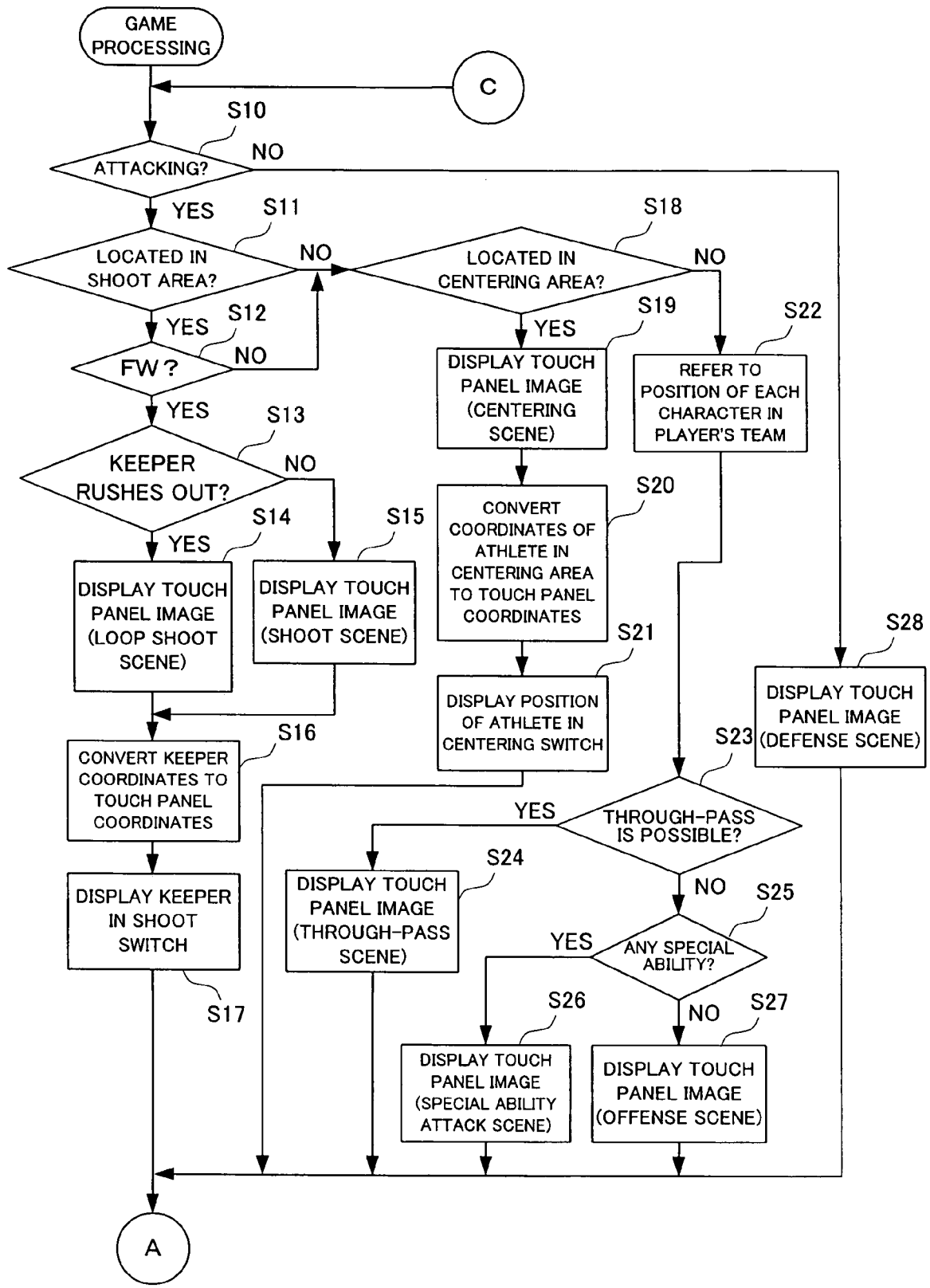
FIG. 29 is a part of a flowchart showing a flow of a process performed by a CPU CORE 31.

In FIG. 29, when the game process starts, various initialization settings are made, and thereafter a soccer game starts. The CPU core 31 determines whether the player's team is attacking (S10). If the team is attacking, the control proceeds to step S11, and if it is defending, the control proceeds to step S28.

At step S11, the CPU core 31 determines whether the selected character 50 keeping the ball 51 is located in the shoot area. If the selected character 50 is in the shoot area, whether the position of the selected character 50 is a forward (FW) is determined. If it is a forward, the control proceeds to step S13. If the case where the selected character 50 is located outside the shoot area or if the selected character 50 is in the shoot area but the position thereof is not a FW, the control proceeds to step S18.

At step S13, the CPU core 31 determines whether the keeper 65 rushes out (i.e., the keeper is located outside the goal area). If the keeper 65 is located outside the goal area, the touch panel image 834*e* for a loop shoot scene is displayed on the second LCD 12 at step S14 (FIG. 19), and the control proceeds to step S16. On the other hand, if the keeper 65 is in the goal area, the touch panel image 834*d* for a shoot scene is displayed on the second LCD 12 at step S15 (FIG. 15), and the control proceeds to step S16. Note that at steps S14 and S15, the image of the keeper 65 is not displayed in the button switch image 66 associated with a shoot.

At step S16, the CPU core 31 converts the coordinate data of the keeper 65 in the game field to touch panel coordinates (FIG. 16). Then, the image of the keeper 65 is displayed at a position obtained by the coordinate conversion (S17). As a result, an image as shown in FIG. 15 is displayed on the second LCD 12.

At step 518, the CPU core 31 determines whether the selected character 50 keeping the ball 51 is located in the centering area.

If the selected character 50 is located in the centering area, the CPU core 31 displays the touch panel image 834*c* for a centering scene on the second LCD 12 (S19), and converts coordinate data of athletes present in the centering area in the game field to touch panel coordinates (S20 in FIG. 10), and a corresponding mark is displayed at the position of each athlete that has been obtained by the coordinate conversion (S21). As a result, an image as shown in FIG. 9 is displayed on the second LCD 12.

If the selected character 50 is located outside the centering area, the CPU core 31 refers to the current position of each athlete in the player's team (S22), and determines whether a through-pass is possible based on positional relationships between the athletes (S23). If a through-pass can be made, the touch panel image 834*b* for a through-pass scene is displayed on the second LCD 12 (S24 in FIG. 5). On the other hand, if a through-pass cannot be made, whether the selected character 50 has any special ability is determined (S25). If the character has a special ability, the touch panel image 834*h* for a special ability attack associated with the selected character 50 is displayed on the second LCD 12 (S26 in FIG. 7). If it does not have any special ability, the touch panel image 834*a* for a normal attack scene is displayed on the second LCD 12 (S27 in FIG. 4).

If the player's team is defending, the CPU core 31 displays the touch panel image 834*g* for a defensive scene on the second LCD 12 at step S28 (FIG. 20).

Figure 30:
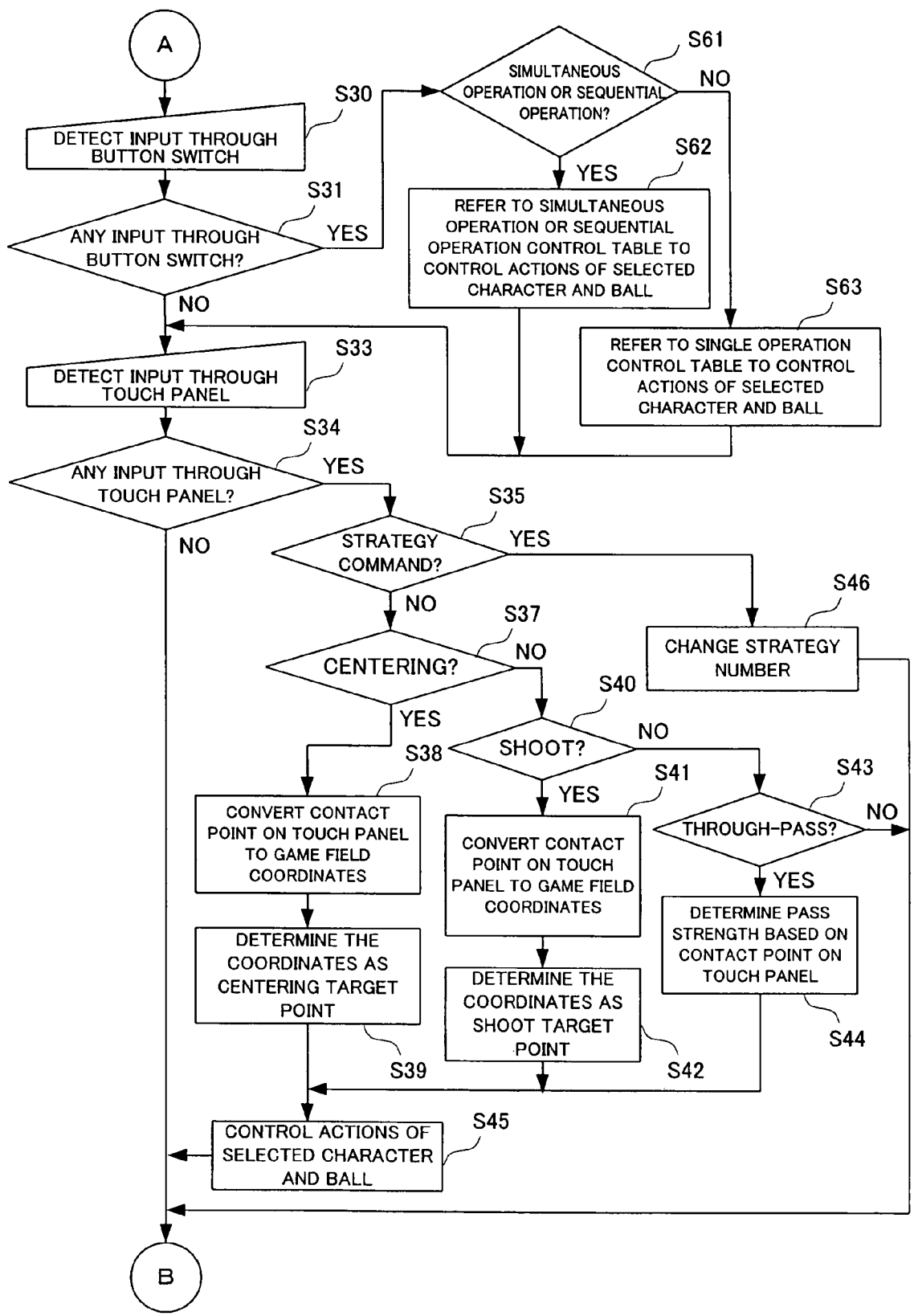
FIG. 30 is another part of the flowchart of FIG. 29 showing a flow of a process performed by the CPU CORE 31.

In FIG. 30, the CPU core 31 attempts to detect an input from the operation switch section 15 (S30), and determines whether there is any input from the operation switch section 15 (S31). If there is an input from the operation switch section 15, the control proceeds to step S61 where whether the input is given by a simultaneous operation or a sequential operation is determined. Note that in the case of the sequential operation, input data from the operation switch section 15 is stored for a predetermined time period, and the determination is made based on that input data. In the case of the simultaneous operation or the sequential operation, the control proceeds to step S62. At step S62, the simultaneous operation or sequential operation control table is referenced to control actions of the selected character 50 and the ball 51, and the control proceeds to step S33. Also, in the case of neither the simultaneous operation nor the sequential operation, the control proceeds to step S63. At step S63, the single operation control table is referenced to control actions of the selected character 50 and the ball 51, and the control proceeds to step S33. In the case where there is no input from the operation switch section 15, the control proceeds to step S33.

At step S33, the CPU core 31 attempts to detect an input from the touch panel 16, and determines whether there is any input from the touch panel 16 (S34). If there is an input from the touch panel 16, the control proceeds to step S35. If there is no input from the touch panel 16, the control proceeds to step S50 in FIG. 31.

At step S35, the CPU core 31 determines whether the input from the touch panel 16 is a strategy command (an instruction associated with a rectangular button switch image). As described above, the determination is possible by collating the coordinate data from the touch panel 16 with one of the operation control tables 811-817 that is currently selected.

Figure 31:
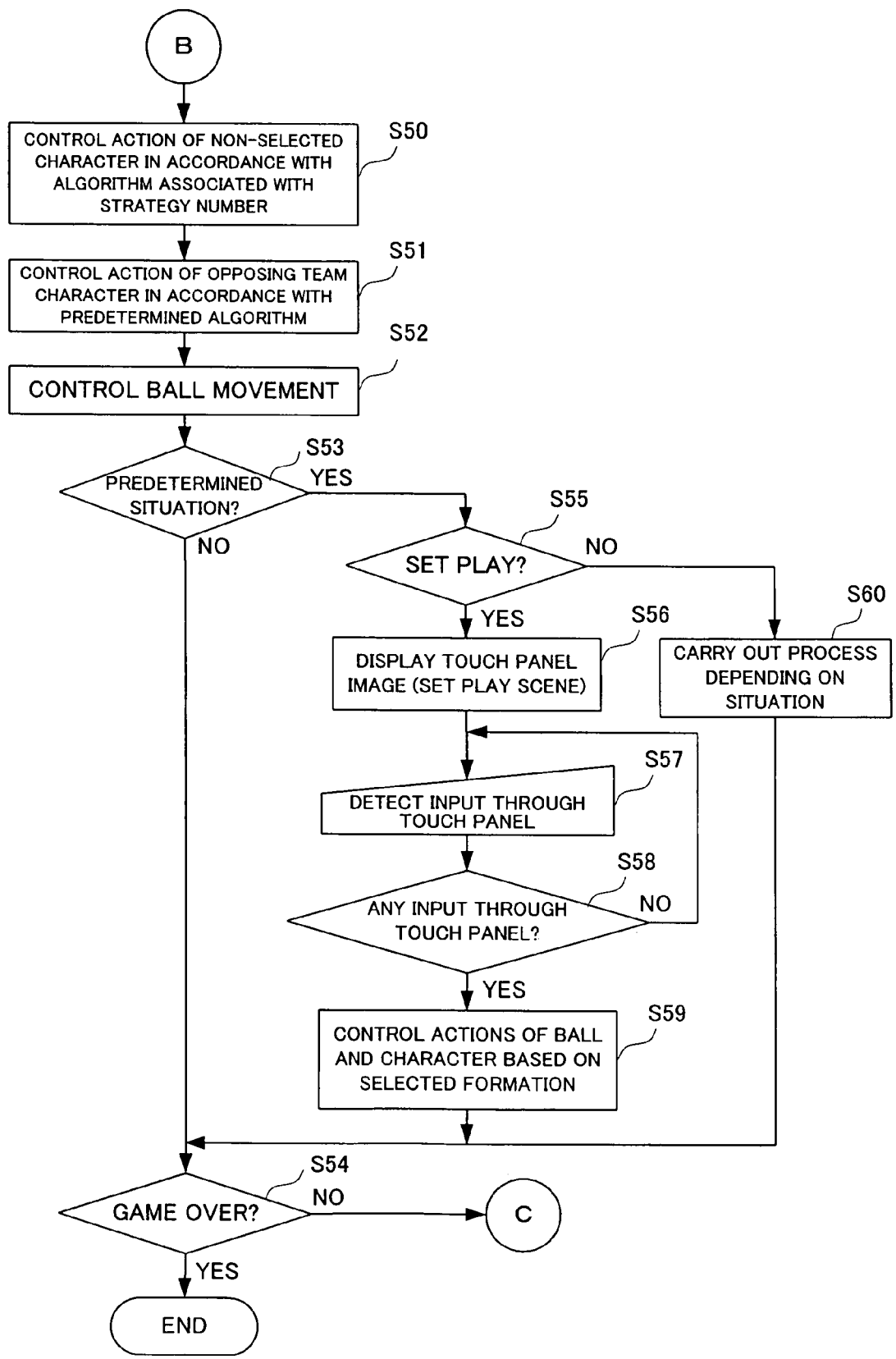
FIG. 31 is still another part of the flowchart of FIG. 29 showing a flow of a process performed by the CPU CORE 31.

In the case where the input from the touch panel 16 is a strategy command, the strategy number 97 which is previously stored in the RAM 37 is updated (S46), and the control proceeds to step S50 in FIG. 31.

On the other hand, in the case where the input from the touch panel 16 is not a strategy command, the selected character 50 is controlled so as to act in accordance with the input from the touch panel 16. Specifically, whether the input from the touch panel 16 is associated with "centering" (i.e., the button switch image 61 which indicates the centering is touched), whether it is associated with "shoot" (i.e., the button switch image 66 which indicates the shoot is touched), and whether it is associated with "through-pass" (i.e., the button switch image 56 which indicates the through-pass is touched) are sequentially determined (S37, S40, and S43). In the case of "centering", coordinate data of a contact point where the stick 17 or a finger has touched the touch panel 16 is converted to game field coordinates (S38), coordinate data (a Y-coordinate is 0) obtained by the conversion is stored into the RAM 37 as the centering target point coordinates 94, and the control proceeds to step S45. Alternatively, in the case of "shoot", the coordinate data of a contact point where the stick 17 or a finger has touched the touch panel 16 is converted to game field coordinates (S41), coordinate data (an X-coordinate is Xe) obtained by the conversion is stored into the RAM 37 as the shoot target point coordinates 95, and the control proceeds to step S45. Alternatively still, in the case of "through-pass", the strength of a through-pass is determined based on coordinate data (an X-coordinate) of a contact point where the stick 17 or a finger has touched the touch panel 16 is converted to game field coordinates (S44), and the control proceeds to step S45. Note that in the case where the input from the touch panel 16 is not associated with "centering", "shoot", or "through-pass", the control proceeds to step S45 without performing any process. At step S45, the action of centering, shoot, or through-pass is implemented based on data set at step S39, S42, or S44 (i.e., the actions of an athlete character and the ball are implemented). Alternatively, in the case where the input from the touch panel 16 is given by touching a button switch image (a feint action, a one-two pass action, a pressing action, etc.) other than the centering, shoot, and through-pass actions, a corresponding action is implemented. Note that in the case where the stick 17 or a finger touches a portion on the touch panel 16 that is not associated with any action, no action is implemented at step S45, and thereafter the control proceeds to step S50 in FIG. 31.

In FIG. 31, the CPU core 31 automatically controls actions of non-selected characters in the player's team in accordance with an algorithm associated with the strategy number 97 stored in the RAM 37 (S50), and further automatically controls characters in the opposing team in accordance with a predetermined algorithm (S51). Also, the CPU core 31 carries out movement control of the ball 51 (S52).

Next, at step S53, the CPU core 31 determines whether the current game situation is a predetermined situation (throw-in, corner kick, free kick, goal kick, etc.). If it is determined to be a predetermined situation, the control proceeds to step S55. If it is not determined to be a predetermined situation, the control proceeds to step S54.

At step S55, the CPU core 31 determines whether the current game situation is a situation where a set play should be carried out (corner kick, free kick, etc.), if it is determined to be a situation where a set play should not be carried out, a process is carried out in accordance with the current situation at step S60 before the control proceeds to step S54. On the other hand, in the case where the current game situation is where a set play should be carried out, the touch panel image 834f for a set play in accordance with the current situation is displayed on the second LCD 12 (S56), and the CPU core 31 waits for an input from the touch panel 16 (S57 and S58). Thereafter, if there is an input from the touch panel 16, the CPU core 31 controls actions of the ball 51 and each character based on the formation selected by the player (S59), and the control proceeds to step S54.

At step S54, the CPU core 31 determines whether the soccer match is over. If the match is not over, the control proceeds to step S10 in FIG. 29. If the match is over, the game processing is terminated.

Figure 32:
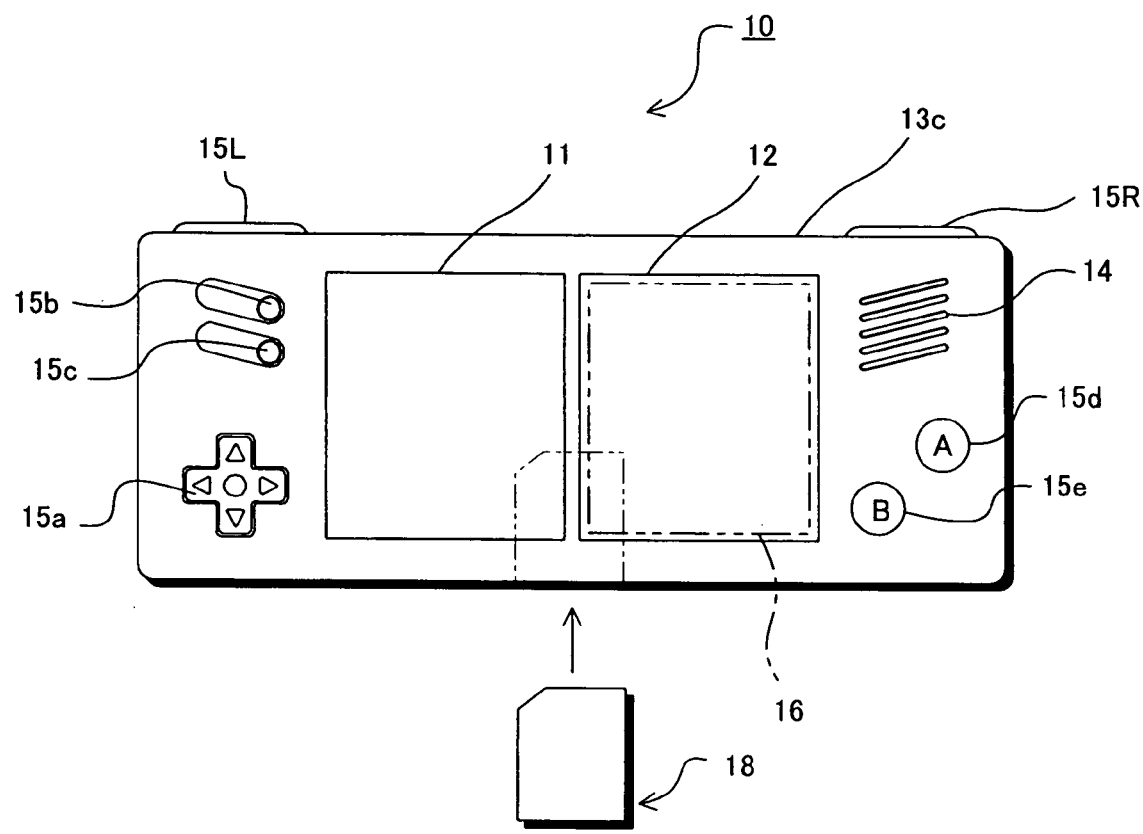
FIG. 32 shows a variation of the hand-held game apparatus shown in FIG. 1.

The above embodiment illustrates examples where two physically separate LCDs 11 and 12 are disposed one on top of the other (i.e., two vertically-arranged screens) as liquid crystal display sections embodying two screens. However, as shown in FIG. 32, a housing 13c without the upper housing 13a may be provided so as to be horizontally wider, such that the LCDs 11 and 12 embodying two screens can be disposed side by side. In this case, for the reason that most users are right-handed, it is preferred that the LCD 12 mounted on the touch panel 16 is disposed on the right side, and the LCD 11 is disposed on the left side. However, the positional relationship therebetween can be reversed for a hand-held game apparatus designed for left-handed users.

Also, in the above embodiment, the LCD 11 disposed on the upper side displays a game image, while the LCD 12 disposed on the lower side displays a touch panel image. However, this configuration can be reversed such that the LCD 11 disposed on the upper side displays a touch panel image, and the LCD 12 disposed on the lower side displays a game image.

Figure 33:
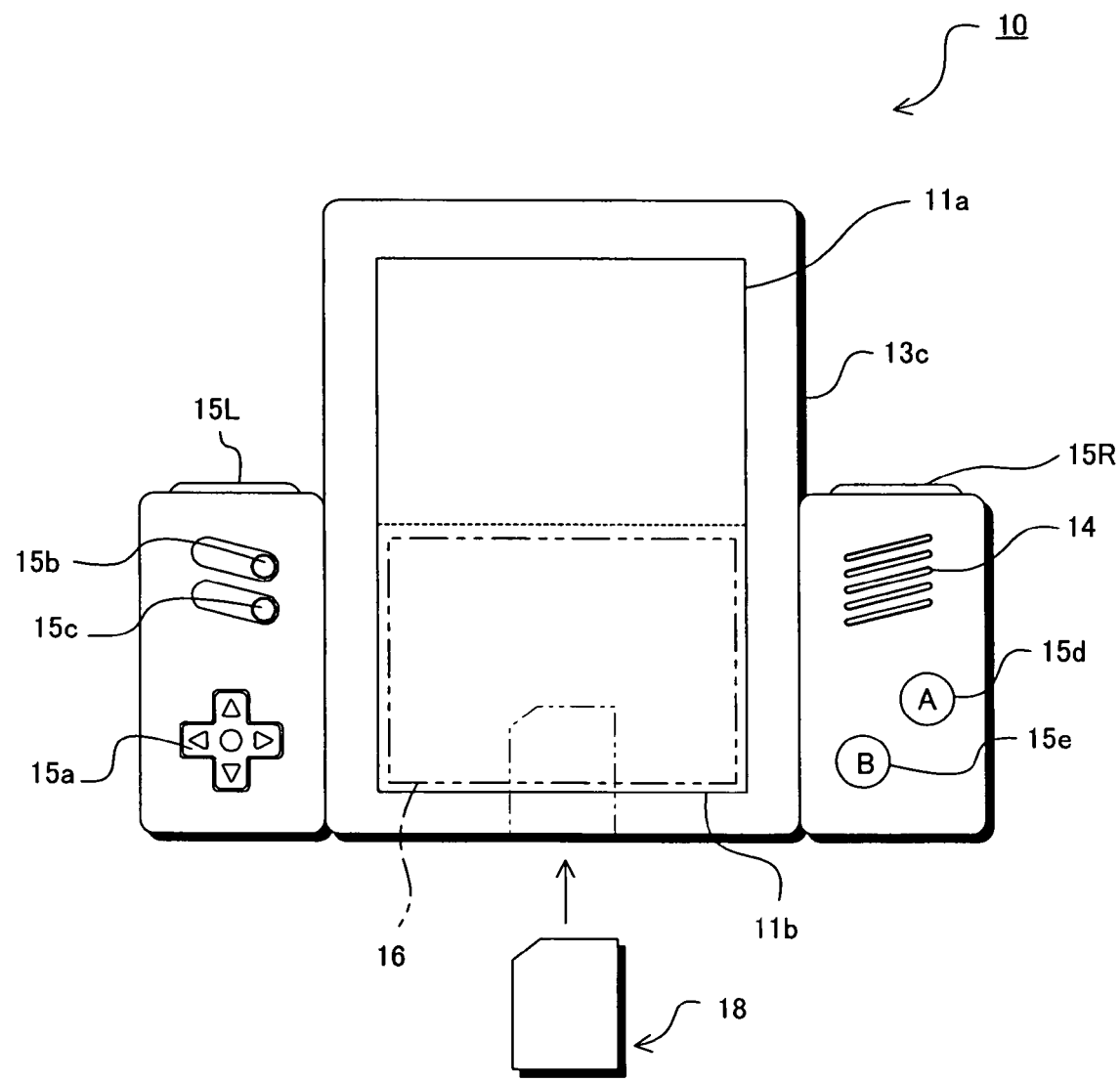
FIG. 33 shows another variation of the hand-held game apparatus shown in FIG. 1.
Figure 34:
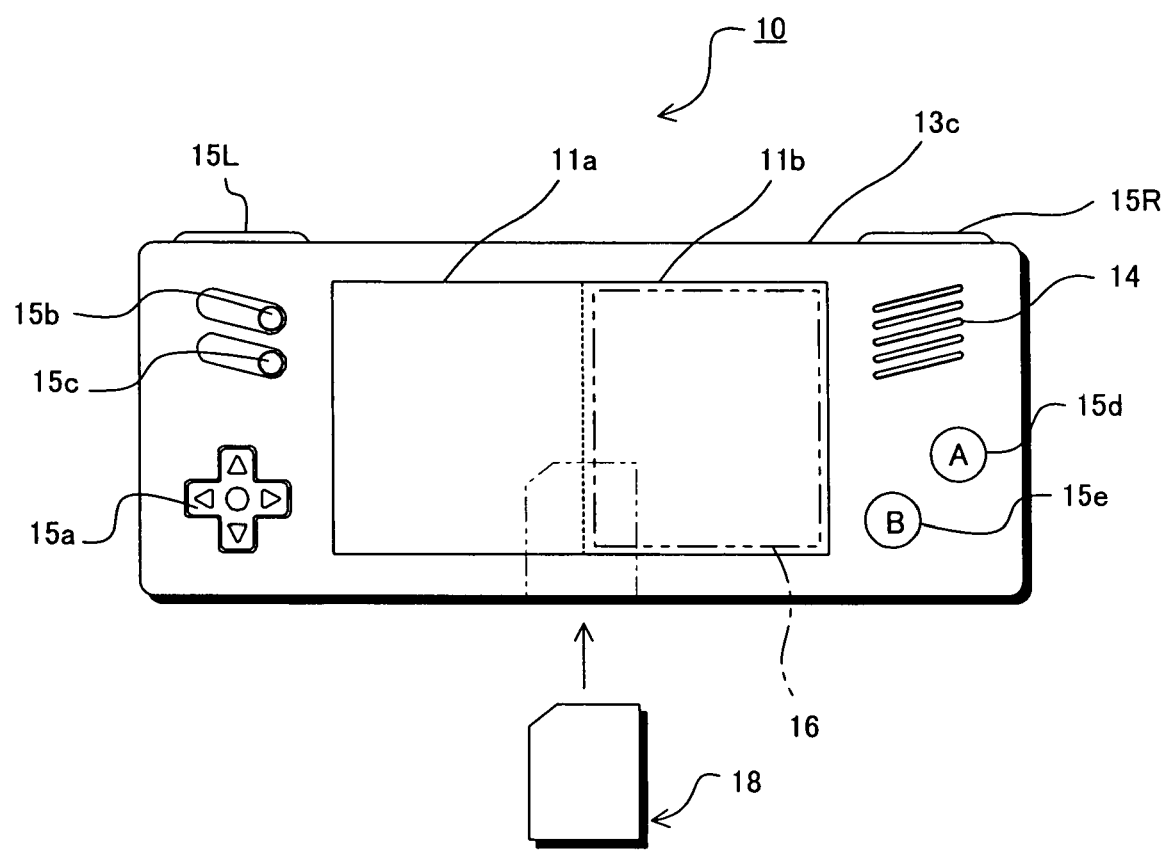
FIG. 34 shows still another variation of the hand-held game apparatus shown in FIG. 1.

In another exemplary arrangement, as shown in FIG. 33, the LCD 11, which is physically one device, is divided into upper and lower sections 11a and lib, such that the upper section 11a displays a game image and the lower section 11b displays a touch panel image, instead of employing the two physically separate and vertically-arranged LCDs 11 and 12. In this case, the touch panel 16 may be disposed in a portion corresponding to the lower section 11b of the LCD 11, or on the entire portion of the LCD 11. Also, as shown in FIG. 34, the LCD 11, which is physically one device, may be divided into left and right sections 11a and 11b, such that the left section 11a displays a game image and the right section 11b displays a touch panel image (or vice versa). That is, in the examples of FIGS. 33 and 34, a single screen is divided into two sections which are used to display a plurality of game images.

While the invention has been described in detail, the foregoing description is in all aspects illustrative and not restrictive. It is understood that numerous other modifications and variations can be devised without departing from the scope of the invention.

What is claimed is:

1. A game apparatus for executing a game in which an action of a player object is controlled by a player, the game apparatus comprising:
    a touch panel display provided with a touch panel;
    first button image display control programmed logic circuitry which displays a first button switch image on the touch panel display;
    second button image display control programmed logic circuitry which displays, at least, a second button switch image within the first button switch image on the touch panel display;
    first association programmed logic circuitry which associates a first predetermined action of the player object with the first button switch image;
    second association programmed logic circuitry which associates, with the second button switch image, a second predetermined action which is a same type of action as the first predetermined action and which is more effective than the first predetermined action; and
    action control programmed logic circuitry which, if the touch panel detects a contact with the first button switch image displayed on the touch panel display, causes the player object to execute the predetermined first action associated with the first button switch image, and if the touch panel detects a contact with the second button switch image, causes the player object to execute the predetermined section action associated with the second button switch image.

2. The game apparatus according to claim 1, further comprising:
    third button image display control programmed logic circuitry which displays a third button switch image within the first button switch image; and
    third association programmed logic circuitry which associates a third predetermined action of the player object with the third button switch image,
    wherein if the touch panel detects a contact with the third button switch image, the action control programmed logic circuitry further causes the player object to execute the third predetermined action associated with the third button switch image.

3. The game apparatus according to claim 2, wherein the third predetermined action is the same type of action as the first and second predetermined actions.

4. A computer-readable storage medium having stored therein a game program which causes a computer of a game apparatus to execute a game in which an action of a player object is controlled by a player, the game apparatus comprising a touch panel display provided with a touch panel,
wherein the game program causes the computer to act as:
first button image display control programmed logic circuitry which displays a first button switch image on the touch panel display;
second button image display control programmed logic circuitry which displays, at least, a second button switch image within the first button switch image on the touch panel display;
first association programmed logic circuitry which associates a first predetermined action of the player object with the first button switch image;
second association programmed logic circuitry which associates, with the second button switch image, a second predetermined action which is a same type of action as the first predetermined action and which is more effective than the first predetermined action; and
action control programmed logic circuitry which, if the touch panel detects a contact with the first button switch image displayed on the touch panel display, causes the player object to execute the predetermined first action associated with the first button switch image, and if the touch panel detects a contact with the second button switch image, causes the player object to execute the predetermined second action associated with the second button switch image.

5. The game program according to claim 4, further causing the computer to act as:
third button image display control programmed logic circuitry which displays a third button switch image within the first button switch image; and
third association programmed logic circuitry which associates a third predetermined action of the player object with the third button switch image,
wherein if the touch panel detects a contact with the third button switch image, the action control programmed logic circuitry further causes the player object to execute the third predetermined action associated with the third button switch image.

6. The game apparatus according to claim 5, wherein the third predetermined action is the same type of action as the first and second predetermined actions.

* * * * *

UNITED STATES PATENT AND TRADEMARK OFFICE
CERTIFICATE OF CORRECTION

PATENT NO. : 7,708,641 B2  Page 1 of 1
APPLICATION NO. : 11/038396
DATED : May 4, 2010
INVENTOR(S) : Tawara It is certified that error appears in the above-identified patent and that said Letters Patent is hereby corrected as shown below:

On the cover page, under (54), and col. 1, line 1, the title should read as follows:

GAME APPARATUS AND GAME PROGRAM

Signed and Sealed this

Thirteenth Day of July, 2010

David J. Kappos
*Director of the United States Patent and Trademark Office*